(12) United States Patent
Naruse

(10) Patent No.: US 6,460,259 B1
(45) Date of Patent: Oct. 8, 2002

(54) WHEEL ALIGNMENT ADJUSTING DEVICE

(75) Inventor: Yutaka Naruse, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 47 days.

(21) Appl. No.: 09/617,834

(22) Filed: Jul. 17, 2000

(30) Foreign Application Priority Data

Jul. 16, 1999 (JP) .......................................... 11-203385

(51) Int. Cl.[7] .............................. G01B 5/24; G01B 5/255
(52) U.S. Cl. .................................. 33/203.14; 33/203.12
(58) Field of Search .......................... 33/286, 288, 203, 33/203.12, 203.13, 203.14, 203.18, 203.19, 203.2, 203.21

(56) References Cited

U.S. PATENT DOCUMENTS

| | | | |
|---|---|---|---|
| 4,430,802 A | * 2/1984 | Cole | .................. 33/203.12 |
| 4,924,591 A | 5/1990 | Brodu | |
| 5,088,320 A | * 2/1992 | Fukuda et al. | ............ 33/203.13 |
| 5,111,585 A | * 5/1992 | Kawashima et al. | ..... 33/203.12 |
| 5,268,731 A | * 12/1993 | Fuchiwaki et al. | ....... 33/203.12 |
| 5,313,710 A | * 5/1994 | Wakamori et al. | ....... 33/203.12 |
| 5,586,062 A | * 12/1996 | Colarelli, III | ............ 33/203.18 |
| 5,815,935 A | * 10/1998 | Fukuda et al. | ........... 33/203.12 |

FOREIGN PATENT DOCUMENTS

| | | |
|---|---|---|
| DE | 198 07 522 A1 | 3/1999 |
| EP | 0 504 438 A1 | 9/1992 |
| JP | 7-5076 | 1/1995 |
| JP | 7-35652 | 2/1995 |
| JP | 9-280843 | 10/1997 |
| JP | 9-329433 | 12/1997 |

* cited by examiner

Primary Examiner—Diego Gutierrez
Assistant Examiner—Madeline Gonzalez
(74) Attorney, Agent, or Firm—Sughrue Mion, PLLC

(57) ABSTRACT

A wheel alignment adjusting device in which adjustment of a toe angle can be effected accurately, precisely, easily, and in a short time. A wire is anchored to a supporting frame at which an endless track is provided. An intermediate portion of the wire is trained around a pulley of a rotary encoder. A rotational angle of the supporting frame is transmitted to the rotary encoder with the rotational angle magnified. Accordingly, a minute angle can be measured accurately.

13 Claims, 28 Drawing Sheets

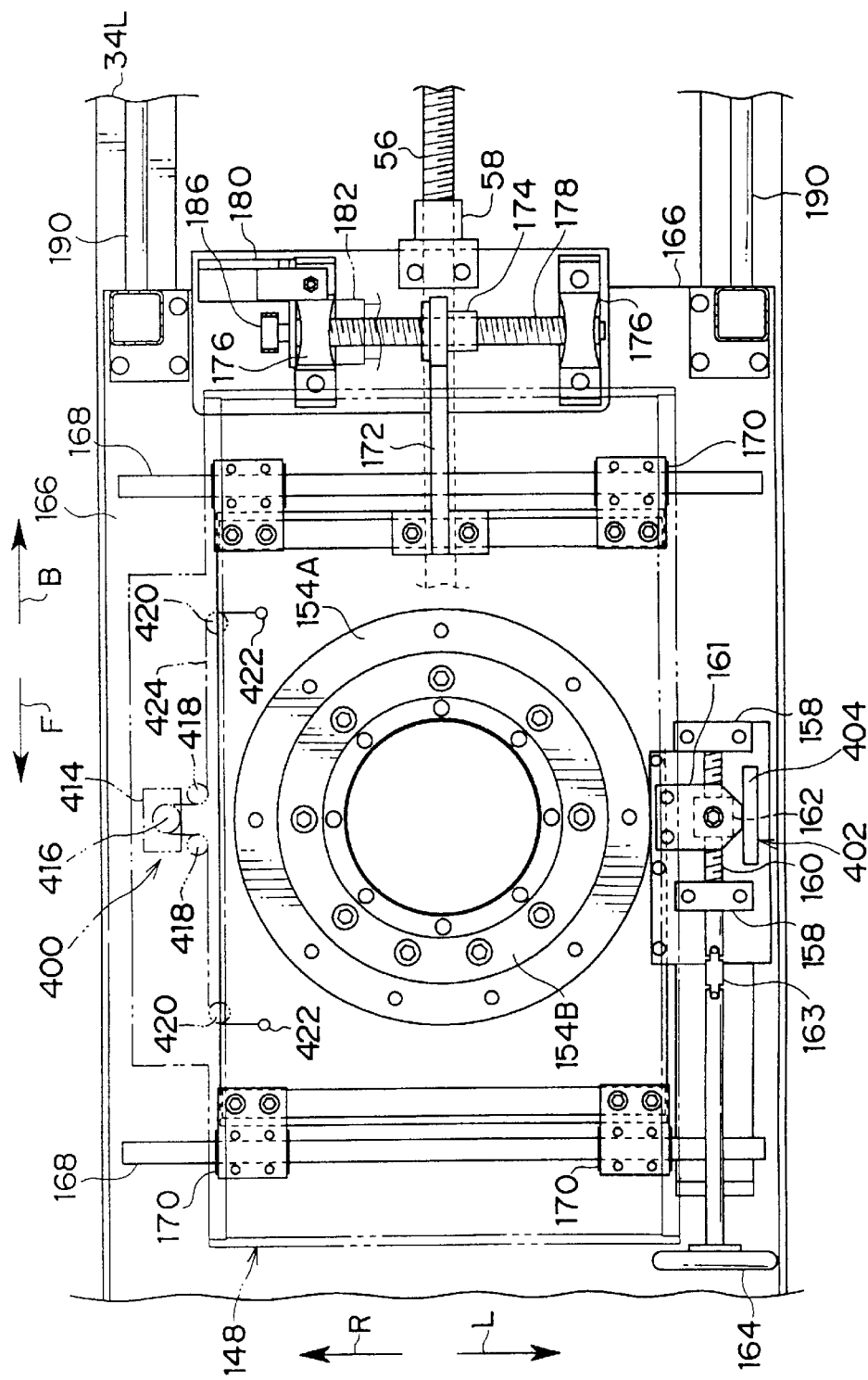
F I G. 17

——— : RATE OF CHANGE IN LATERAL FORCE
(FIRST DERIVATIVES)

——— : RATE OF CHANGE IN LONGITUDINAL FORCE
(FIRST DERIVATIVES)

WHEEL ALIGNMENT ADJUSTING DEVICE

BACKGROUND OF THE INVENTION

1. Field of the Invention

The present invention relates to a wheel alignment adjusting device for adjusting alignment of wheels of a vehicle.

2. Description of the Related Art

Generally, wheels of a vehicle are provided with a camber angle for ensuring traveling stability of the vehicle, and are provided with a toe angle for preventing irregular wear caused by the provision of the camber angle.

Or, conversely, a toe angle is provided in order to balance the forces generated at the front tires and at the rear tires of the vehicle so as to ensure travelling stability of the vehicle, and the toe angle and the camber angle are combined so as to carry out adjustment for improving the traveling stability of the vehicle and minimizing the irregular wear of the tire under limiting conditions such as the structural dimensions of the vehicle and the like.

Accordingly, in order to improve the traveling stability and irregular wear resistance of the tire when the vehicle is traveling, it is important to adjust the toe angle and the camber angle, which are positional angles (wheel angles) applied to each wheel.

Adjustment of the toe angle and the camber angle is carried out with the vehicle disposed on a wheel alignment adjusting device.

In recent years, the number of highways has increased such that improvement of stability of the vehicle at a minute rudder angle has come to be desired.

On the other hand, the above-described stability of the vehicle at the minute rudder angle is largely affected by wheel alignment (positional angles applied to each wheel).

Conventionally, the toe angle of a wheel has been measured by various types of measuring devices and adjusted, for example, to an adjusted value specified by a vehicle manufacturer.

However, a device which can measure minute angles of a tire is expensive and it takes time to measure the angle. (In order to measure the angle in seconds, the position of the wheel is measured in detail by a laser (e.g., Japanese Patent Application Laid-Open (JP-A) No. 9-280843, JP-A-9-329433), or by a potentiometer (JP-A-7-35652), or by a dial gauge, and the minute angle is calculated.)

On the other hand, even if the adjustment of wheel alignment is carried out based on a value which is set by the manufacturer, manufacturing errors when the vehicle is manufactured, deterioration of a bush or a damper due to changes with time, twisting of the vehicle body, setback (difference between left and right wheel bases) of the wheels, and further, errors in the characteristics of the tire, or the like can occur. Consequently, the value set by the manufacturer is not always the best set value for the current vehicle.

As a result, for example, JP-A-7-5076 discloses a method of adjusting alignment which takes the above-described manufacturing errors of the vehicle body and the like into consideration and which does not use the value set by the manufacturer.

In the method disclosed in JP-A-7-5076, for example, in order to adjust the toe angle of a rear wheel, the rear wheel is loaded on a roller of a loading stand and rotated. Then, the positional angle of the rear wheel is adjusted so that the force generated at the roller in a rotational axial direction is minimized.

However, the positional angle of the wheel needs to be changed various times in order to collect data and find the best point. Also, adjustment of the toe angle must be carried out a plurality of times. Thus, complexity of the operation is not solved.

SUMMARY OF THE INVENTION

With the aforementioned in view, an object of the present invention is to provide a wheel alignment adjusting device in which alignment can be carried out easily and in a short time, and, in particular, adjustment of a toe angle can be effected accurately and precisely.

A first aspect of the present invention is a wheel alignment adjusting device, comprising: a unit which includes a wheel rotating device which rotates wheel of a vehicle loaded on the wheel alignment adjusting device; a base which rotatably supports said unit on a horizontal surface; a rotational angle detecting device which is mounted to one of said unit and said base and which detects a rotational angle by rotating a rotational shaft of said rotational angle detecting device; and an elongated member, one portion of the elongated member being trained around the rotational shaft and another portion of the elongated member being anchored to a predetermined position of another of said unit and said base, the predetermined position being separated, in a radial direction, from a rotational center of said unit by a distance which is greater than a radius of the rotational shaft.

For example, the rotational angle detecting device is mounted to the unit. The one portion of the elongated member (e.g., a wire) is trained around the rotational shaft of the rotational angle detecting means, and the other portion of the elongated member is anchored to the base. When the unit is rotated with respect to the base, the elongated member rotates the rotational shaft of the rotational angle detecting means.

Because the elongated member is anchored to a position which is separated, in the radial direction, from the rotational center of the unit by a length which is larger than the radius of the rotational shaft of the rotational angle detecting device, the rotational angle of the rotational shaft is larger than the rotational angle of the unit (rate of magnification of the angle =distance from the rotational center of the unit to the anchored position of the wire/radius of the rotational shaft of the rotational angle detecting device).

As a result, the rotational angle of the unit can be measured more precisely and accurately than a case in which the ratio of the rotational angle of the unit to the rotational angle of the rotational shaft of the rotational angle detecting device is 1 to 1 (direct transmission).

Needless to say, the larger the rate of magnification, the more minute the rotational angle of the unit which can be measured.

Further, the wheel loaded on the unit can be rotated by the wheel rotating means. At this time, force which is applied from the wheel to the wheel rotating device can be measured by a force sensor which is further included in the wheel alignment adjusting device of the first aspect.

Next, description will be given of a method of adjusting wheel alignment by using the wheel alignment adjusting device. As an example, a method of adjusting toe angles of the rear wheels will be described.

Each of the rear wheels is loaded on the unit and rotated by the wheel rotating device. At this time, force of one rotation of the wheel which is applied to the unit in the rotational axial direction of the wheel is measured by the force sensors, and the measured data is collected. The collection of data is carried out separately for the left and right wheels.

Further, in the above-described collection of data, a position at which all of the rotating directions of the wheel rotating means are parallel (to the longitudinal direction of the vehicle) is a reference position. Moreover, each unit is rotated from the reference position by one predetermined angle at a time and then the measured data is collected in the same way.

Then, when the data in which the fluctuation in the force applied to the unit (applied to the roller) in the rotational axial direction of the wheel is the smallest is obtained, calculation is made as to by how many degrees the position of the unit at which the data has been obtained has deviated from the reference position. The toe angle of each rear wheel is adjusted by the calculated degrees of angle. In this way, stable traveling of the vehicle is possible.

The data of the right rear wheel and the data of the left rear wheel are compared, and thereafter, the left and right toe angles may be respectively adjusted so that the force in the rotational axial direction which is generated by the left rear wheel and the force in the rotational axial direction which is generated by the right rear wheel are offset. In this way as well, stable traveling of the vehicle is possible.

A second aspect of the present invention is a wheel alignment adjusting device according to the first aspect, further comprising: a display device which is connected to said rotational angle detecting device and which displays the rotational angle of said unit with respect to said base.

In the wheel alignment adjusting device of the second aspect, the rotating angle of the unit when rotated is displayed on the display device.

As a result, when the unit is rotated, an operator can determine accurately over what angle the unit has rotated.

A third aspect of the present invention is a wheel alignment adjusting device according to the second aspect, further comprising: a reference position detecting device which detects a reference position of said unit in a rotating direction with respect to said base, wherein said display device displays a rotational angle of said unit on the basis of the reference position.

In the wheel alignment adjusting device of the third aspect, when the unit is rotated, the rotating angle of the unit based on the reference position is displayed on the display device.

As a result, the operator can determine accurately the angle over which the unit has rotated from the reference position.

A fourth aspect of the present invention is a wheel alignment adjusting device which includes a plurality of wheel driving devices which drive wheels of a vehicle loaded on said wheel alignment adjusting device, said wheel driving device comprising: a unit which includes wheel rotating device which rotates a wheel; a base which rotatably supports said unit in a horizontal plane; a rotational angle detecting device which is mounted to one of said unit and said base, said rotational angle detecting device including a rotating member which rotates on the basis of a rotation of said unit with respect to said base, and on the basis of the rotation of said rotating member, said rotational angle detecting device detects a rotational angle of said unit with respect to said base; and a rotation transmitting member, one portion of said rotation transmitting member being mounted to said rotating member so as to have a predetermined rotating radius, and another portion of said rotation transmitting member being anchored to a predetermined position of another of said unit and said base, and said rotation transmitting member transmitting the rotation of said unit with respect to said base to said rotating member, wherein a distance between the predetermined position and a rotational center of said unit with respect to said base is larger than the predetermined rotating radius of said rotating member.

In a fifth aspect of the present invention, in the wheel alignment adjusting device of the fourth aspect, on the basis of the distance and the predetermined rotating radius, a magnification ratio, which is a ratio of the rotational angle of said rotating member with respect to the rotational angle of said unit with respect to said base, is determined.

BRIEF DESCRIPTION OF THE DRAWINGS

FIG. 17 is a plan view which shows a moving mechanism of the tire driving device.

DESCRIPTION OF THE PREFERRED EMBODIMENTS

An embodiment of a wheel alignment adjusting device will be described hereinafter with reference to FIGS. 1 through 28.

Figure 1:
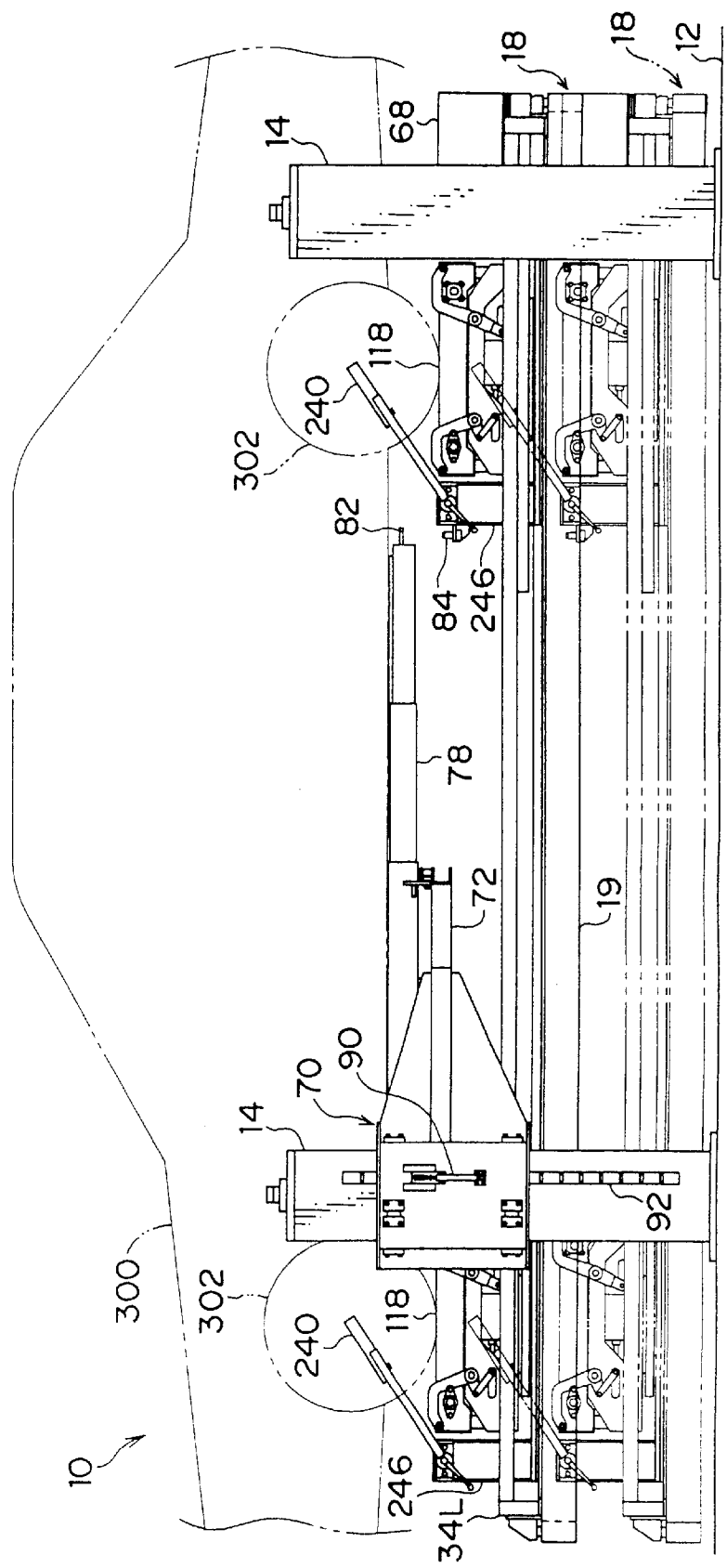
FIG. 1 is a side view, as seen from a left side of a wheel alignment adjusting device, illustrating a state in which a loading stand and a second sub-base are separated in the vertical direction.
Figure 4:
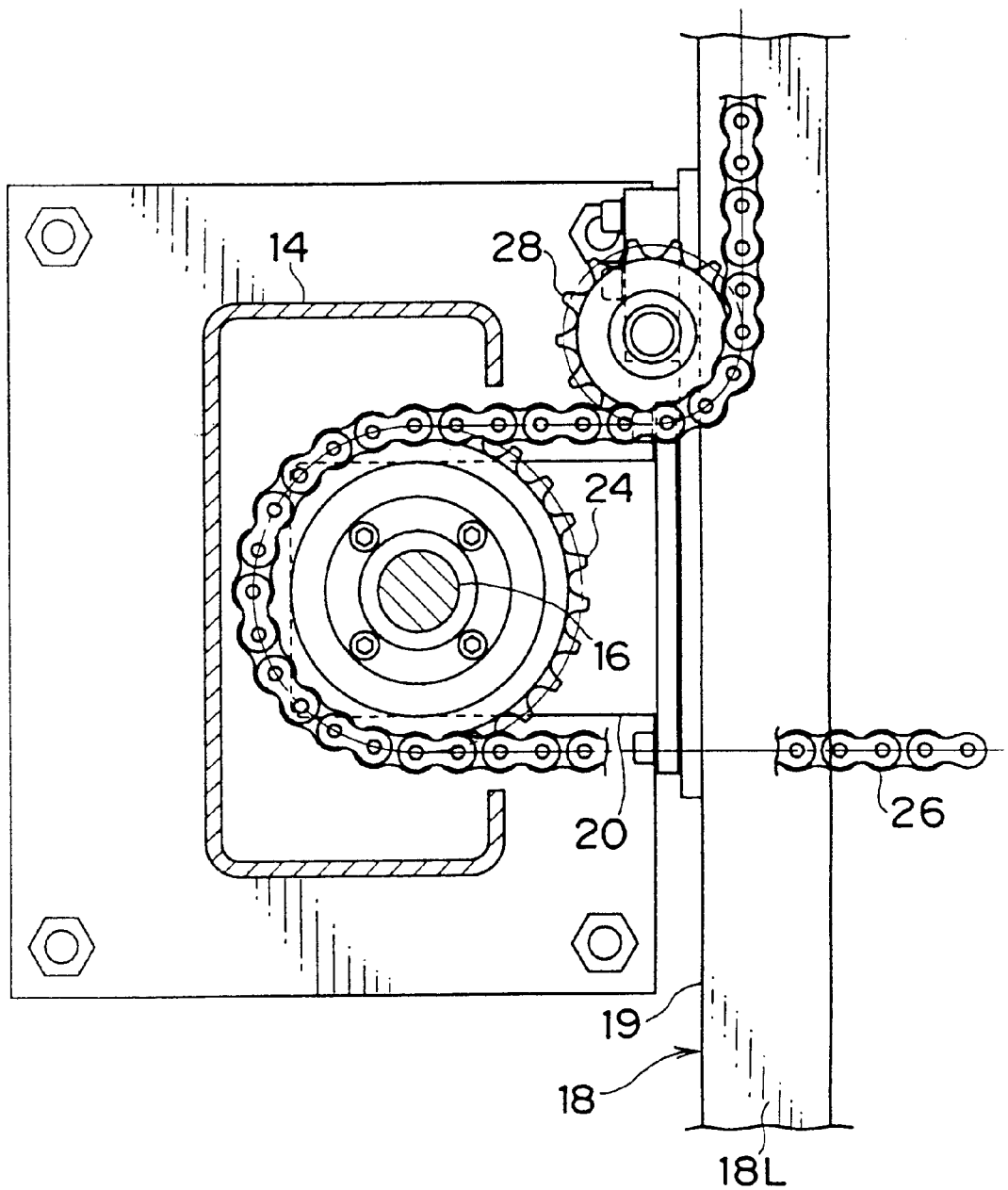
FIG. 4 is a horizontal sectional view of a vicinity of the supporting pillar.

As illustrated in FIGS. 1 and 4, a wheel alignment adjusting device 10 of the present embodiment includes four supporting pillars 14 which stand vertically upright at a floor surface 12.

Figure 2:
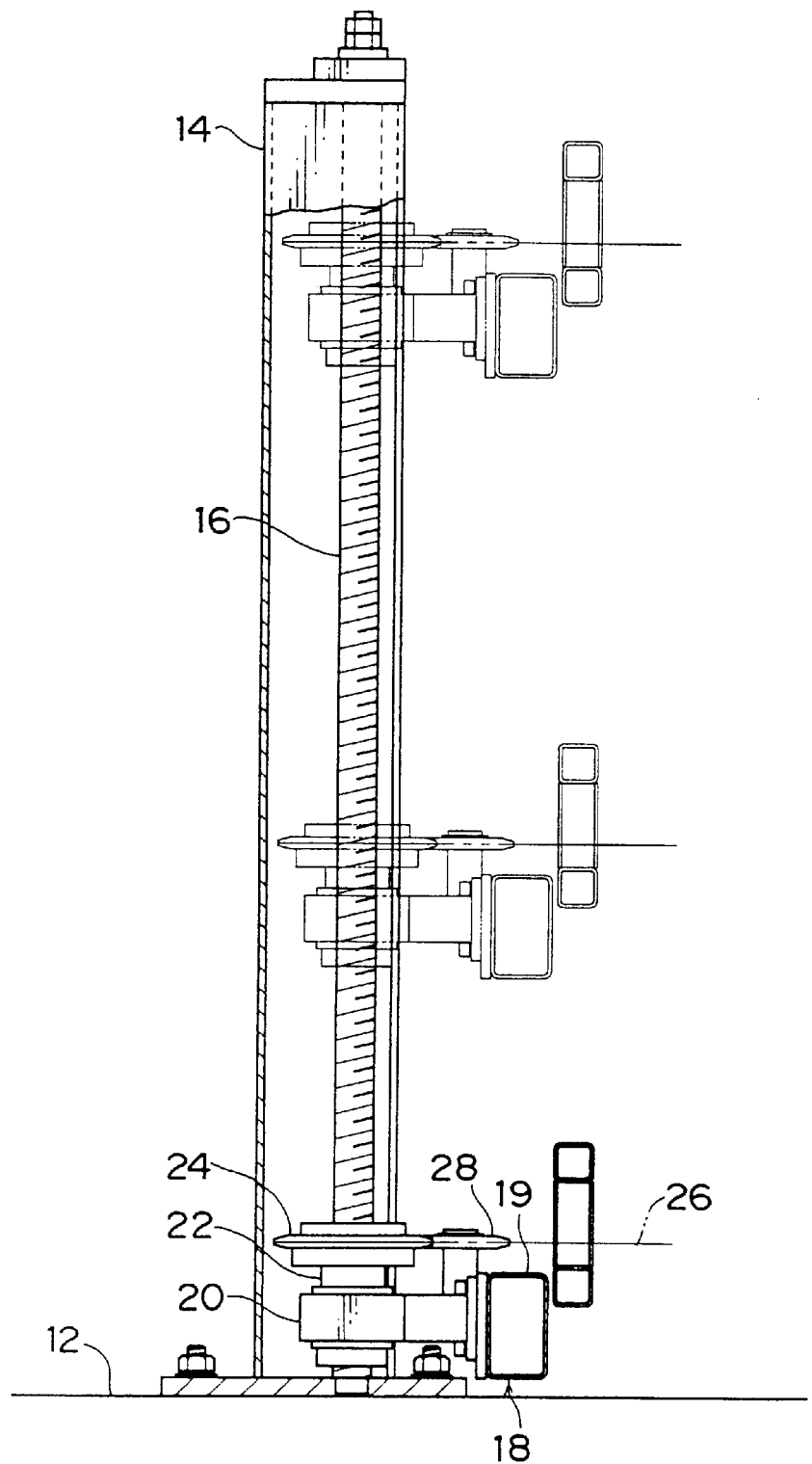
FIG. 2 is a vertical sectional view of a supporting pillar.

As illustrated in FIG. 2, a vertical feed screw 16 is fixed to the supporting pillar 14 in a state of being suspended from an upper portion of the supporting pillar 14.

Figure 3:
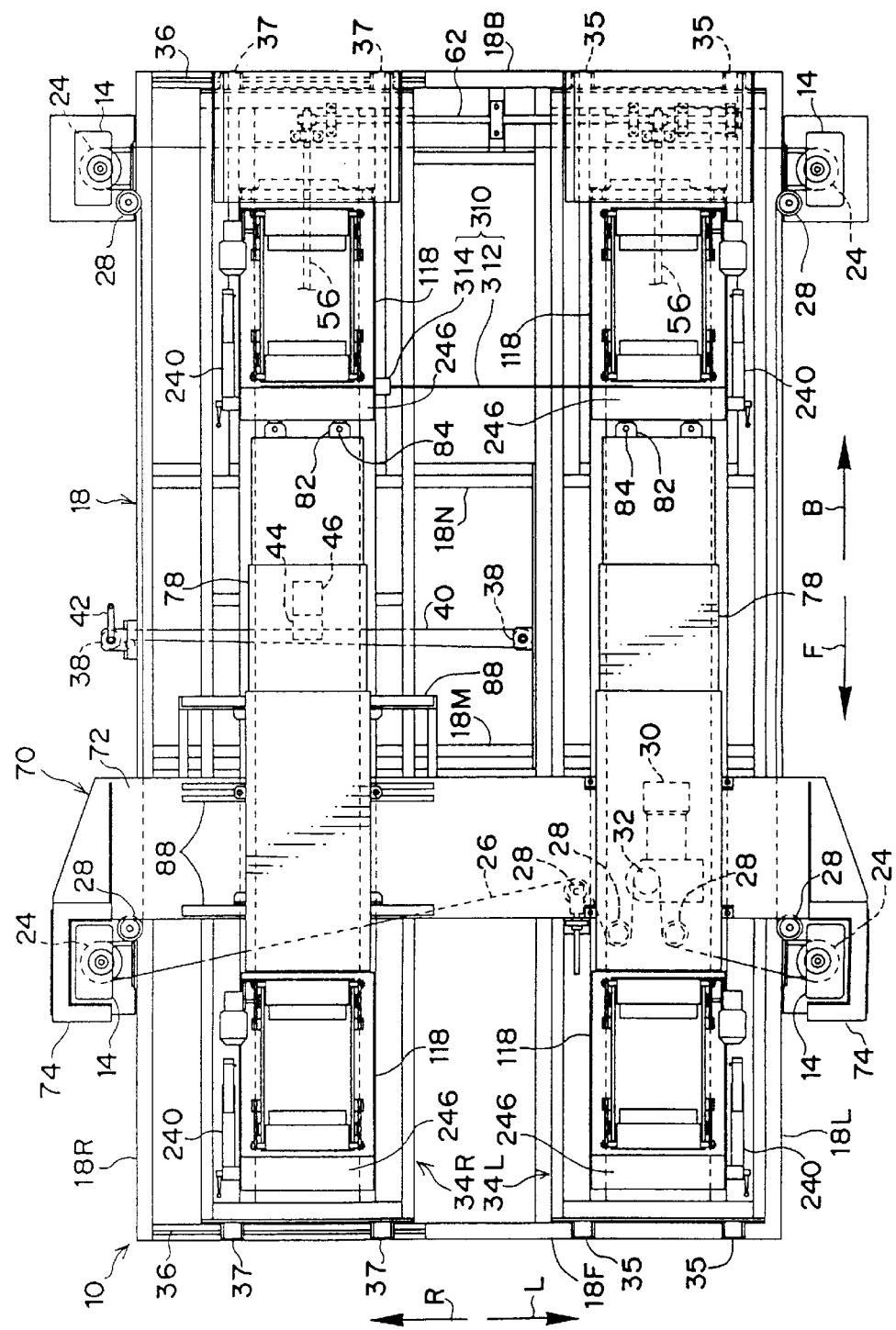
FIG. 3 is a plan view of the wheel alignment adjusting device illustrating a state in which loading stands for the rear wheels are disposed at a furthest rearward position.

As shown in FIG. 3, a loading stand 18 is disposed between the two supporting pillars 14 at the side in the direction of arrow R and the two supporting pillars 14 at the side in the direction of arrow L.

The loading stand 18 includes a substantially rectangular main frame 19 which is formed from frame members 18F, 18B, 18R, 18L, 18M, 18N.

As shown in FIG. 2, a shaft receiving portion 20 is mounted to a position of a side surface of the main frame 19 which position opposes the supporting pillar 14.

A rotating member 22, in which a female screw (not shown in the drawings) is formed, is rotatably supported at the shaft receiving portion 20 via a bearing (not shown in the drawings).

The female screw of the rotating member 22 screws together with the vertical feed screw 16. A sprocket 24 is coaxially fixed to the axial direction upper end portion of the rotating member 22.

As shown in FIGS. 2 through 4, the main frame 19 includes an endless chain 26 which meshes with the sprockets 24. The chain 26 is supported by plural sprockets 28 which are rotatably supported at the main frame 19.

As shown in FIG. 3, a motor unit 30 which drives the chain 26 is mounted to the main frame 19. The chain 26 meshes with a sprocket 32 which is rotated by the motor unit 30.

The chain 26 rotates the sprockets 24 of the respective supporting pillars 14 simultaneously. Thus, when the chain 26 is driven in a predetermined direction, the respective rotating members 22 rotate simultaneously such that the loading stand 18 is raised along the vertical feed screws 16.

When the chain 26 is driven in the direction opposite to the predetermined direction, the loading stand 18 is lowered along the vertical feed screws 16.

As illustrated in FIG. 3, a first sub-base 34R and a first sub-base 34L, which extend in the direction of arrow F and in the direction of arrow B, are provided at the upper portion of the main frame 19.

The first sub-base 34L at the arrow L direction side is fixed to the main frame 19 by fixing hardware 35 or the like.

Guide rails 36, which extend along the direction of arrow R and the direction of arrow L, are mounted to the arrow F direction side and the arrow B direction side of the main frame 19.

A linear shaft receiving portion 37, which is engaged so as to be freely slidable along the guide rail 36, is mounted to each of the longitudinal direction end portions of the first sub base 34R. The first sub base 34R is sidable along the direction of arrow R and the direction of arrow L with respect to the main frame 19.

Load receiving rollers (not shown in the drawings), which roll along the top surfaces of the frame members 18M, 18N which extend along the direction of arrow R and the direction of arrow L, are supported so as to be freely rotatable at the bottom surface of the first sub base 34R.

A pair of pulleys 38 is rotatably supported at a longitudinal direction intermediate portion of the main frame 19. An endless wire rope 40 is trained around the pair of pulleys 38.

A handle 42 is mounted to one of the pulleys 38 for rotation of that pulley 38.

A grasping claw 44, which can grasp the wire rope 40, is provided at the first sub-base 34R which is movably supported.

The grasping claw 44 is connected to a solenoid 46 provided at the first sub-base 34R. When the solenoid 46 is in an energized state, the grasping claw 44 grasps the wire rope 40, whereas when the solenoid 46 is in a non-energized state, the grasping claw 44 releases the wire rope 40.

Accordingly, by turning the handle 42 in the state in which the grasping claw 44 is grasping the wire rope 40, the movably supported first sub-base 34R can be moved in the direction of arrow R and the direction of arrow L.

Figure 5:
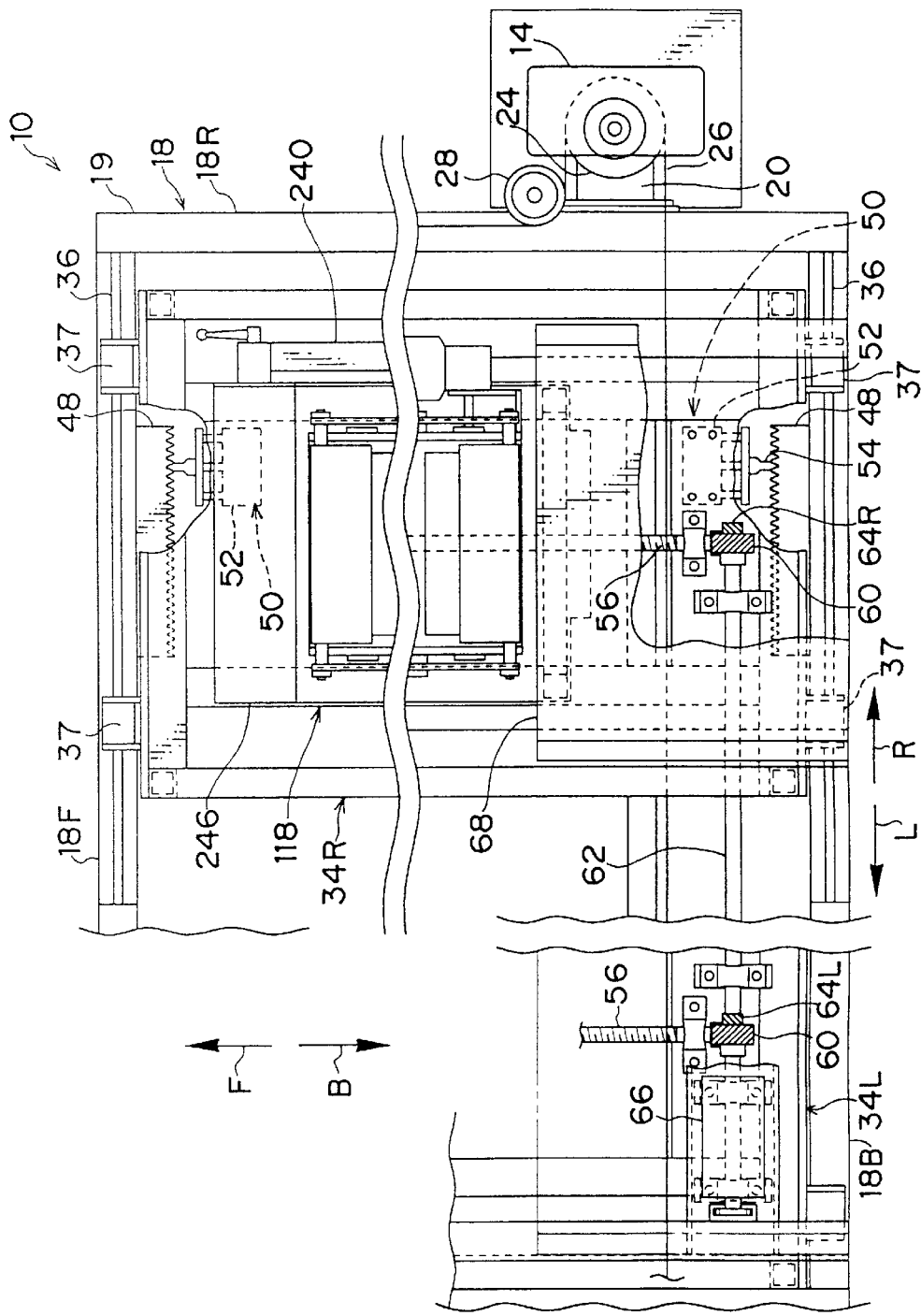
FIG. 5 is an enlarged plan view of vicinities of front and rear ends of the wheel alignment adjusting device.

As illustrated in FIG. 5, at the main frame 19, a rack 48 is fixed to each of the arrow F direction side frame member 18F and the arrow B direction side frame member 18B.

A lock device 50 is disposed at each of the arrow F direction side end portion and the arrow B direction side end portion of the movably supported first sub-base 34R.

The lock device 50 is provided with an wedge-shaped tooth 54 which is driven by a solenoid 52 to move in directions of approaching and moving apart from the rack 48 of the main frame 19. Due to the tooth 54 entering into the space ("valley") between two teeth of the rack 48, the movably supported first sub-base 34R is accurately positioned and fixed, parallel to the first sub-base 34L which is fixed to the main frame 19.

Usually, the solenoid 52 of the lock device 50 is in a non-energized state, and at this time, the tooth 54 is entered into a valley of the rack 48 as illustrated in FIG. 5 (locked state). On the other hand, when the solenoid 52 is energized, the tooth 54 separates from the rack 48 (unlocked state).

As illustrated in FIG. 3, a tire driving device 118 is provided in a vicinity of the arrow F direction side end portion and in a vicinity of the arrow B direction side end portion of the first sub-base 34R and the first sub-base 34L, respectively. The internal structure of the tire driving device 118 will be described later.

The tire driving device 118 at the arrow B direction side of the first sub-base 34R is supported by a mechanism, which will be described layer, so as to be sidable in the direction of arrow F and in the direction of arrow B with respect to the first sub-base 34R. The tire driving device 118 at the arrow F direction side of the first sub-base 34R is fixed and does not slide in the direction of arrow F and the direction of arrow B with respect to the first sub-base 34R.

Similarly, the tire driving device 118 at the arrow B direction side of the first sub-base 34L is supported, by a mechanism which will be described later, so as to be sidable in the direction of arrow F and in the direction of arrow B with respect to the first sub-base 34L. The tire driving device 118 at the arrow F direction side of the first sub-base 34L is fixed and does not slide in the direction of arrow F and the direction of arrow B with respect to the first sub-base 34L.

A feed screw 56, which extends along the moving direction of the slidably supported tire driving device 118, is rotatably supported at the first sub-base 34R which is supported so as to be movable.

Figure 12:
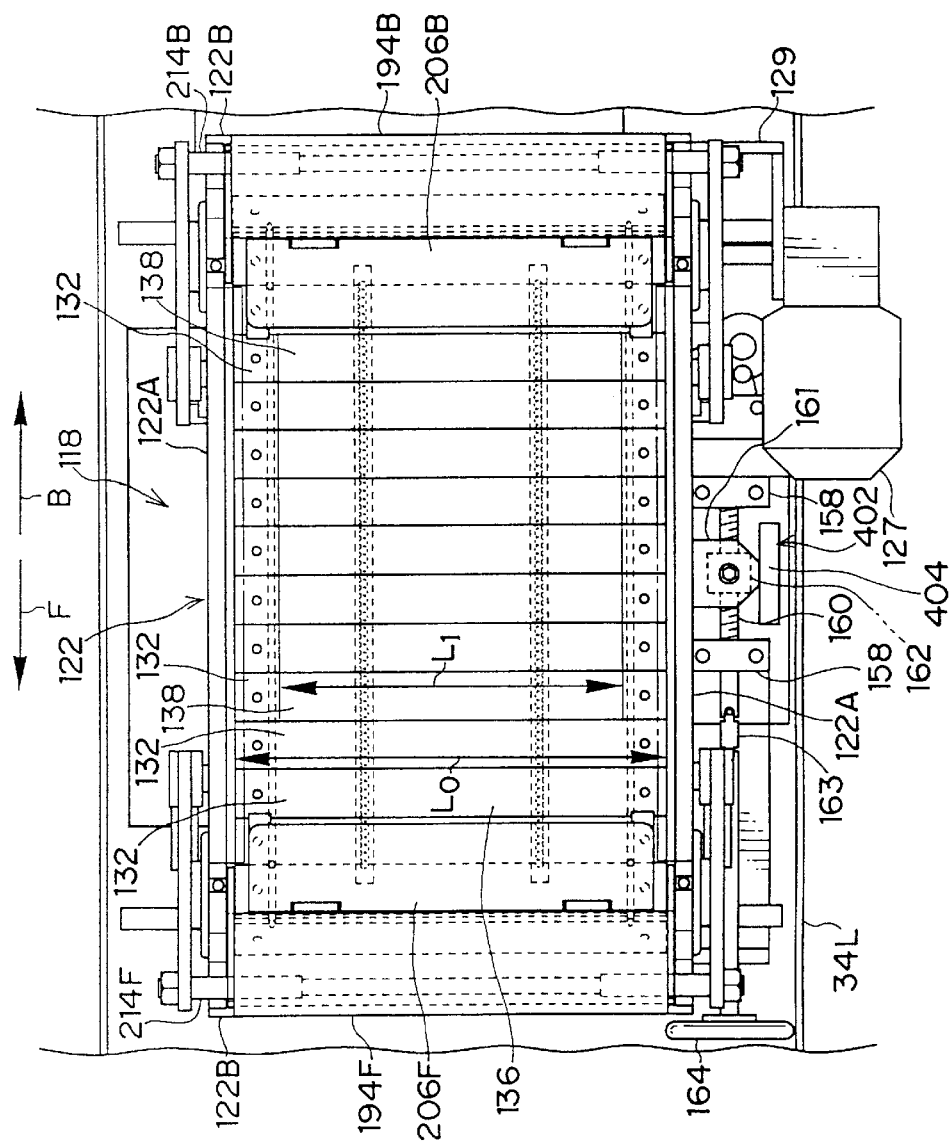
FIG. 12 is a plan view of the tire driving device.

As illustrated in FIG. 12, a nut 58 having a female screw (not shown in the drawings) which screws together with the feed screw 56, is fixed to the slidably supported tire driving device 118. By rotating the feed screw 56, the tire driving device 118 having the nut 58 can be moved in the direction of arrow F and in the direction of arrow B.

As shown in FIG. 5, a gear 60 is fixed to the arrow B direction side end portion of the feed screw 56.

Because the first sub-base 34L has the same structure as that of the first sub-base 34R, except for the fact that the first sub-base 34L is fixed to the main frame 19, description of the first sub-base 34L will be omitted.

As shown in FIG. 5, a shaft 62 which extends along the arrow R direction and the arrow L direction is rotatably supported at the arrow B direction side of the main frame 19.

The shaft 62 is formed from two shafts of different diameters. A spline shaft portion is provided at the outer surface of the narrow-diameter shaft. A spline hole portion, with which the spline shaft portion engages, is formed in the large-diameter shaft. Thus, the two shafts are engaged such that torque can be transmitted from one shaft to the other, and relative movement in the axial direction thereof of one shaft to the other is possible.

A gear 64R, which meshes with the gear 60 of the feed screw 56 provided at the first sub-base 34R, is fixed to the arrow R direction end portion of the shaft 62. A gear 64L, which meshes with the gear 60 of the feed screw 56 provided at the first sub-base 34L, is fixed to the arrow L direction end portion of the shaft 62. By rotating the shaft 62, the two feed screws 56 are rotated simultaneously, and the slidably supported two tire driving devices 118 can be moved simultaneously and by the same amount and in the same direction.

Rotating driving force from a motor unit 66 provided at the main frame 19 is transferred to the shaft 62 via a chain (not shown in the drawings).

Figure 6:
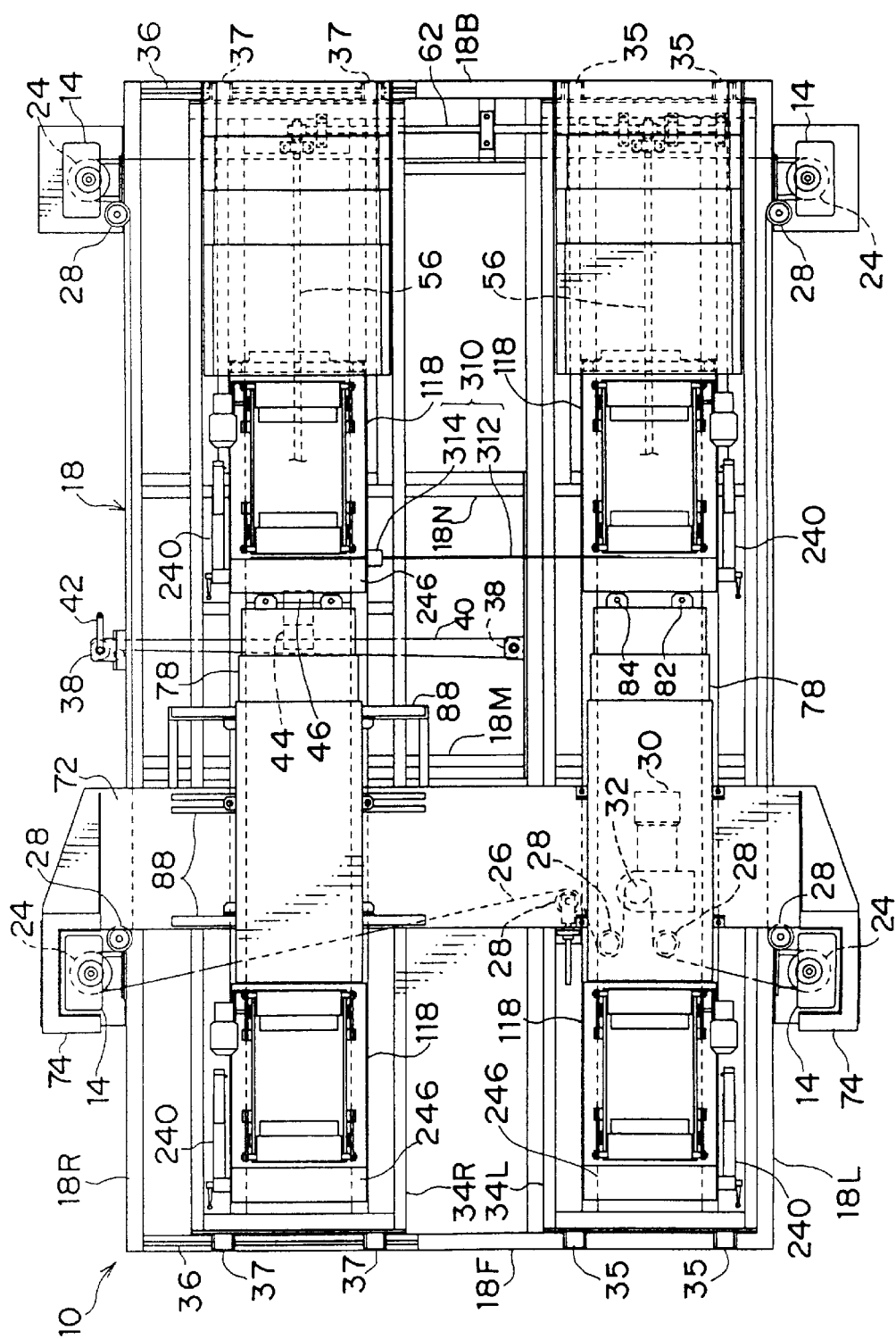
FIG. 6 is a plan view of the wheel alignment adjusting device, and illustrates a state in which the loading stands for the rear wheels are moved slightly forward.
Figure 7:
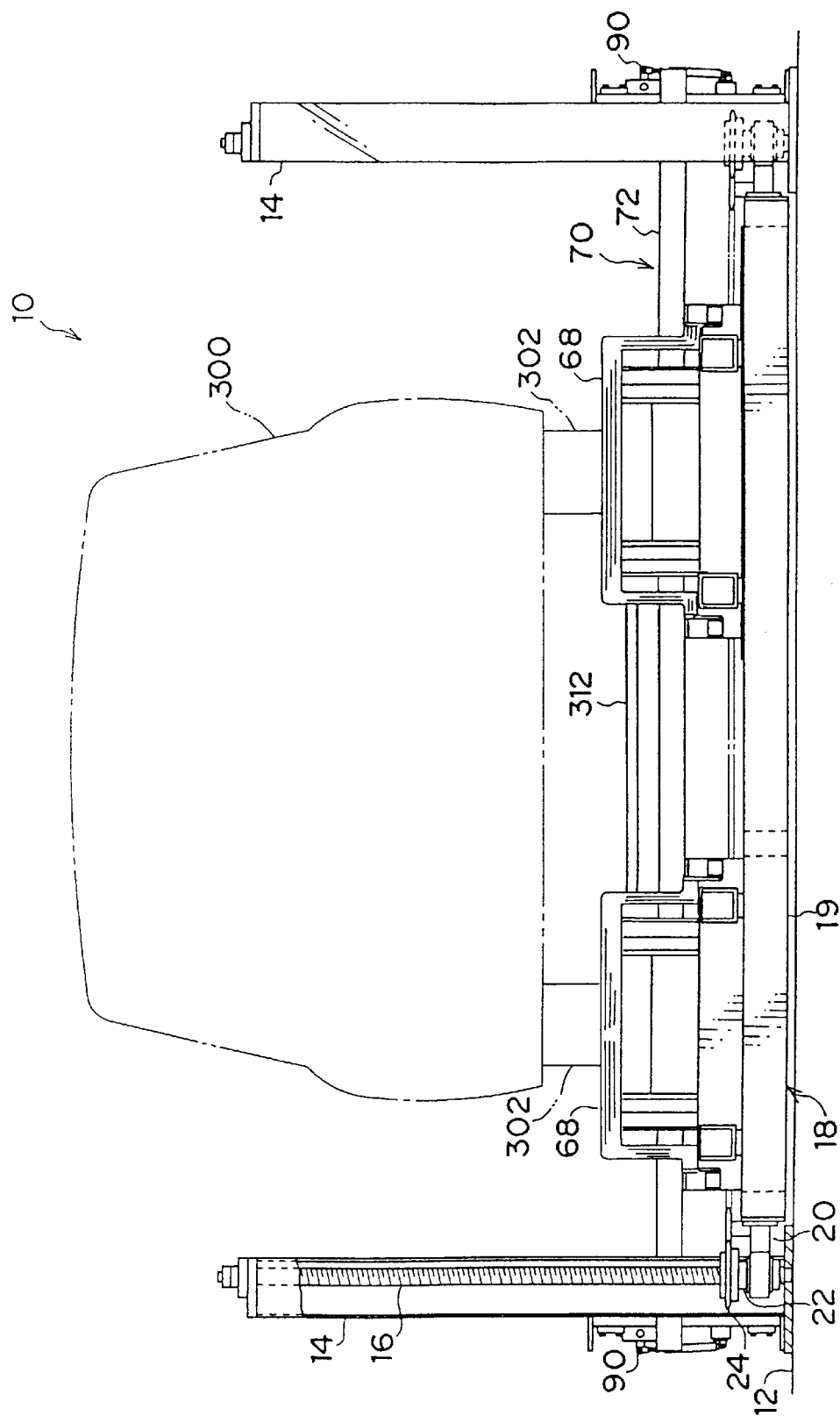
FIG. 7 is a side view of the wheel alignment adjusting device as seen from the rear.

As illustrated in FIGS. 6 and 7, at each of left and right sides, one end of a first transfer plate 68 is fixed to the arrow B direction side tire driving device 118. The first transfer plate 68 is formed from a plurality of substantially U-shaped (in cross section) plate members and is expandable and contractible along the direction of arrow F and the direction of arrow B. The other end of the first transfer plate 68 is fixed to the arrow B direction side frame member 18B of the main frame 19.

Figure 8:
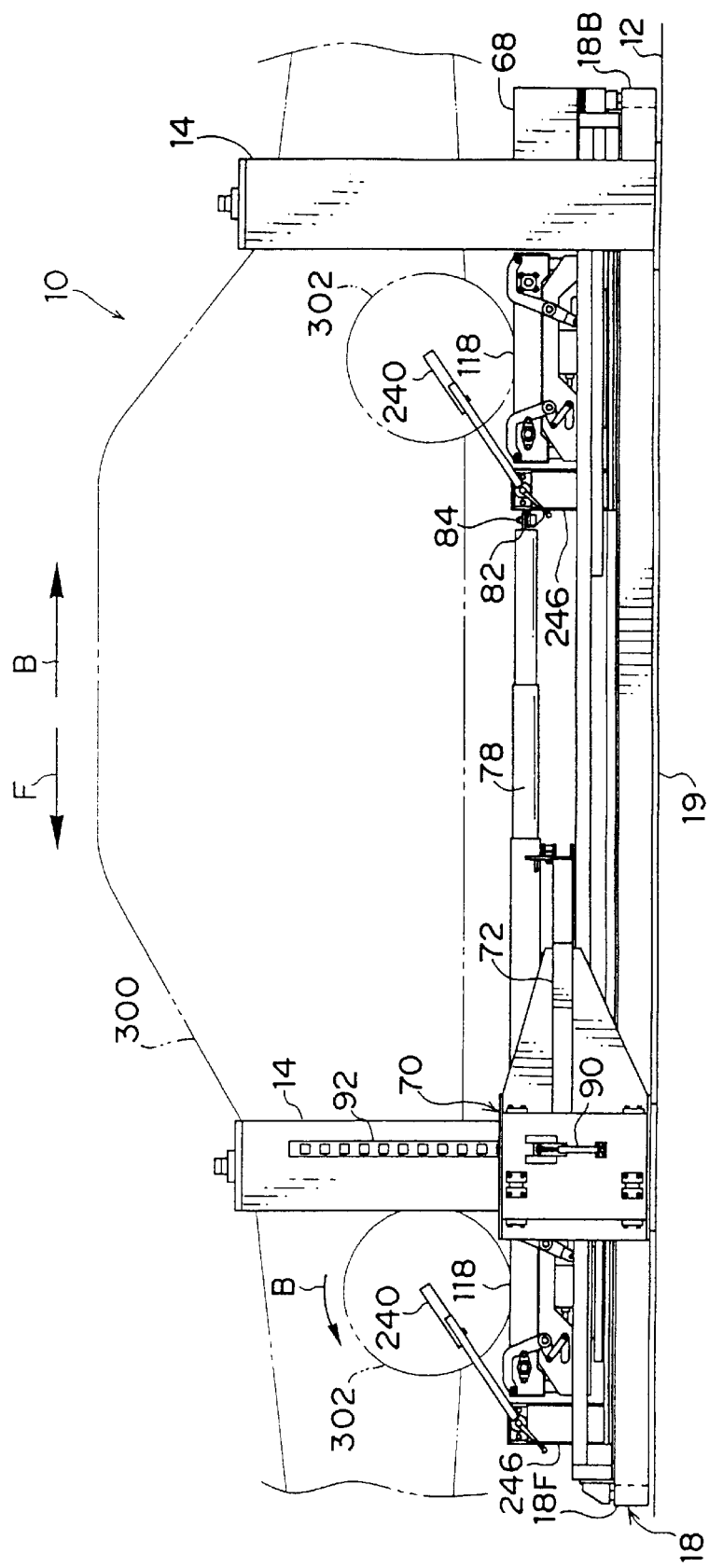
FIG. 8 is a side view, as seen from the left side of the wheel alignment adjusting device, illustrating a state in which the loading stand and a second sub-base have been lowered to a lowermost position.

The upper surface of the tire driving device 118 and the upper surface of the first transfer plate 68 are set at substantially the same height as illustrated in FIG. 8.

Accordingly, even if the slidably supported tire driving device 118 moves in the direction of arrow F, the first transfer plate 68 extends. Therefore, regardless of the position of the tire driving device 118, a vehicle 300 (wheel 302) can be moved from the arrow B direction side of the loading stand 18 onto the tire driving device 118. Second Sub-Base As illustrated in FIGS. 6 and 8, a second sub-base 70 is provided on the loading stand 18.

As illustrated in FIG. 6, the second sub-base 70 is provided with a horizontal member 72 which extends horizontally so as to span between the two arrow F direction side supporting pillars 14.

A supporting portion 74, which is formed so as to enclose three side surfaces of the supporting pillar 14, is provided at each of the arrow R direction end portion and the arrow L direction end portion of the horizontal member 72.

Figure 9:
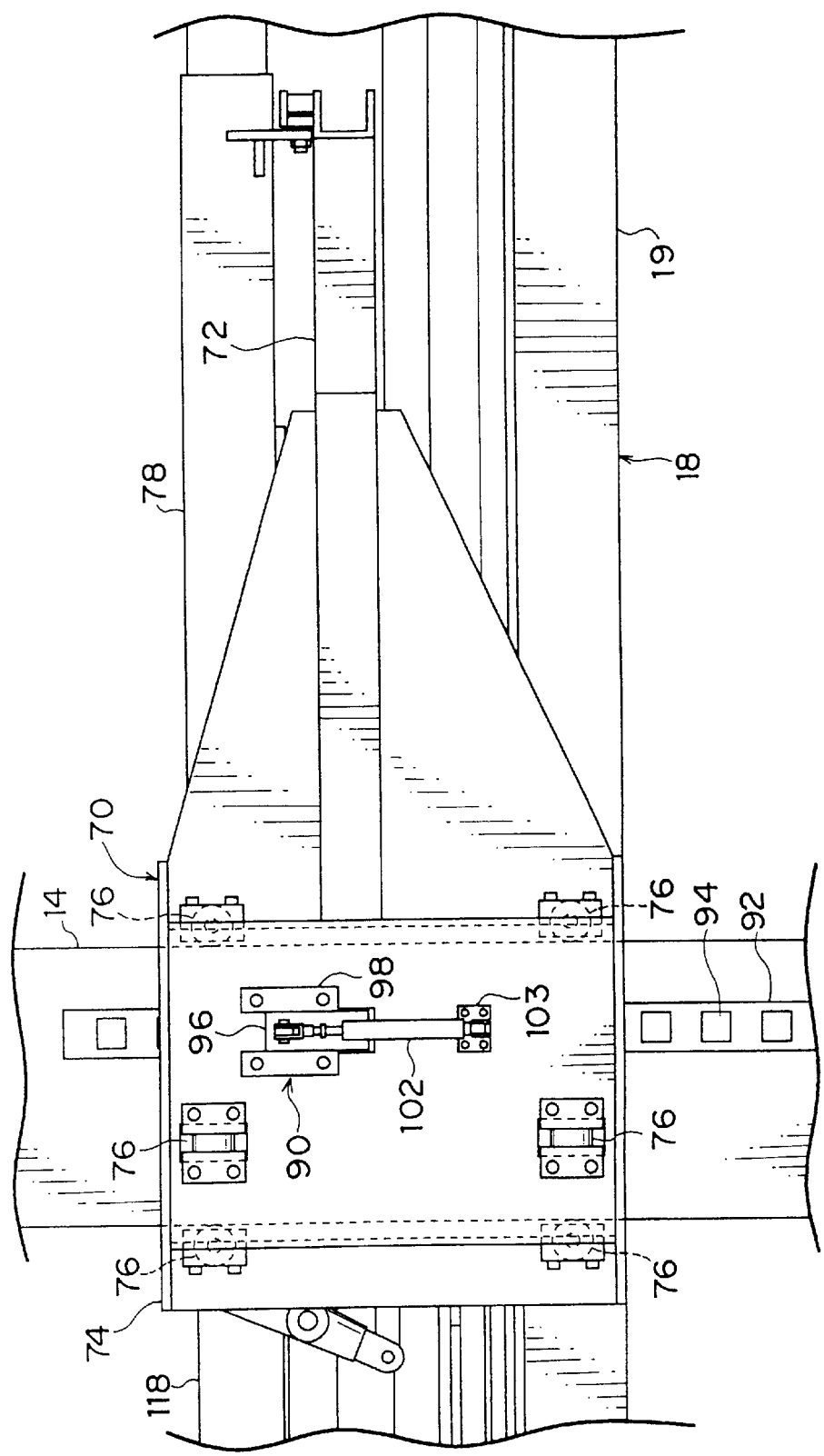
FIG. 9 is a side view, as seen from the left side, of a vicinity of a supporting portion of the second sub-base.

As illustrated in FIG. 9, a plurality of guide rollers 76 are rotatably supported at the supporting portion 74 so as to abut three side surfaces of the supporting pillar 14. The second sub-base 70 can be moved vertically while being guided by the supporting pillars 14.

As illustrated in FIG. 6, a second transfer plate 78 is provided at each of the arrow R direction side and the arrow L direction side at the top portion of the second sub-base 70.

The second transfer plate 78 is formed from a plurality of plates, and is extendable in the direction of arrow B from the second sub-base 70.

The top surface of the second transfer plate 78 and the top surface of the arrow F direction side tire driving device 118 are set to be substantially the same height as illustrated in FIG. 8.

Figure 20:
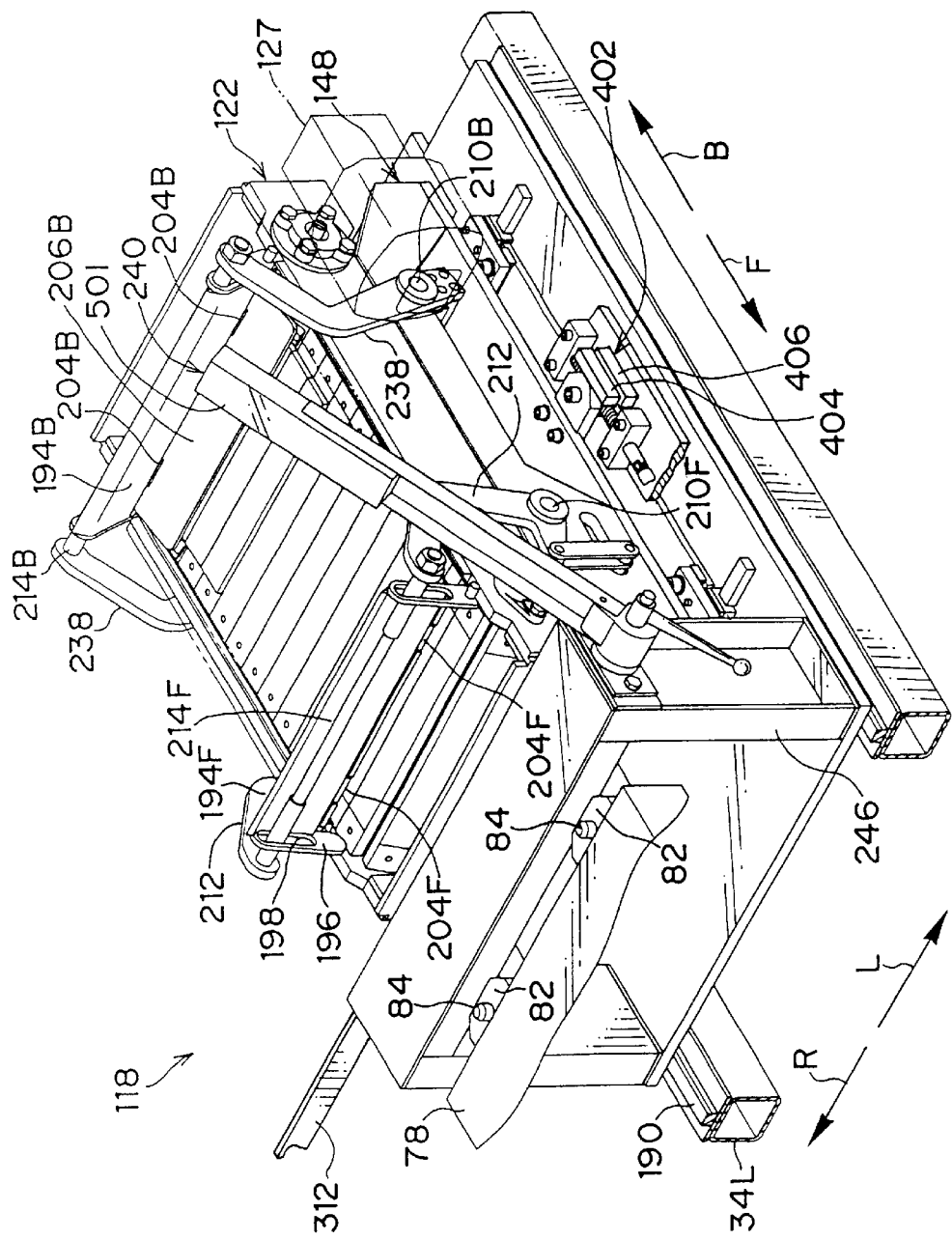
FIG. 20 is a perspective view of the tire driving device illustrating a state in which the wheel stopping plates are inclined.

As illustrated in FIG. 6 and FIG. 20, plate members 82 are provided at the arrow B direction side end portion of the second transfer plate 78. A hole which extends vertically is formed in each plate member 82.

Pins 84, each of whose axial direction is the vertical direction, are provided in a vicinity of the upper end of the arrow F direction side of a supporting stand 246 (which will be described later) which is provided at the arrow B direction side tire driving device 118 which is supported so as to be movable.

The pin 84 can be inserted into the hole of the plate member 82 from below. When the movable tire driving device 118 is moved in the direction of arrow B in a state in which the pin 84 is inserted into the hole of the plate member 82, the second transfer plate 78 extends (see FIGS. 3 and 9) in a state in which it spans between the second sub-base 70 and the movably supported tire driving device 118. When the movable tire driving device 118 moves in the direction of arrow F, the second transfer plate 78 becomes shorter (see FIG. 6).

The second transfer plate 78 at the arrow L direction side is fixed with respect to the horizontal member 72 such that this second transfer plate 78 does not move in the direction of arrow R and in the direction of arrow L.

Referring now to FIG. 3, a plurality of guide rollers (not illustrated) are rotatably supported at the arrow R direction side second transfer plate 78. These guide rollers engage with a plurality of guide rails 88 which are provided at the horizontal member 72 and extend in the direction of arrow R and the direction of arrow L. As a result, the second transfer plate 78 at the arrow R direction side can slide in the direction of arrow R and the direction of arrow L with respect to the horizontal member 72. When the first sub-base 34R is moved in the direction of arrow R or in the direction of arrow L with the pin 84 inserted into the hole of the plate member 82 (see FIG. 8), the second transfer plate 78 also is moved in the direction of arrow R or in the direction of arrow L, such that the two tire driving devices 118 on the first sub-base 34R and the second transfer plate 78 at the arrow R direction side are always maintained in a relation of being disposed on a straight line.

Figure 10:
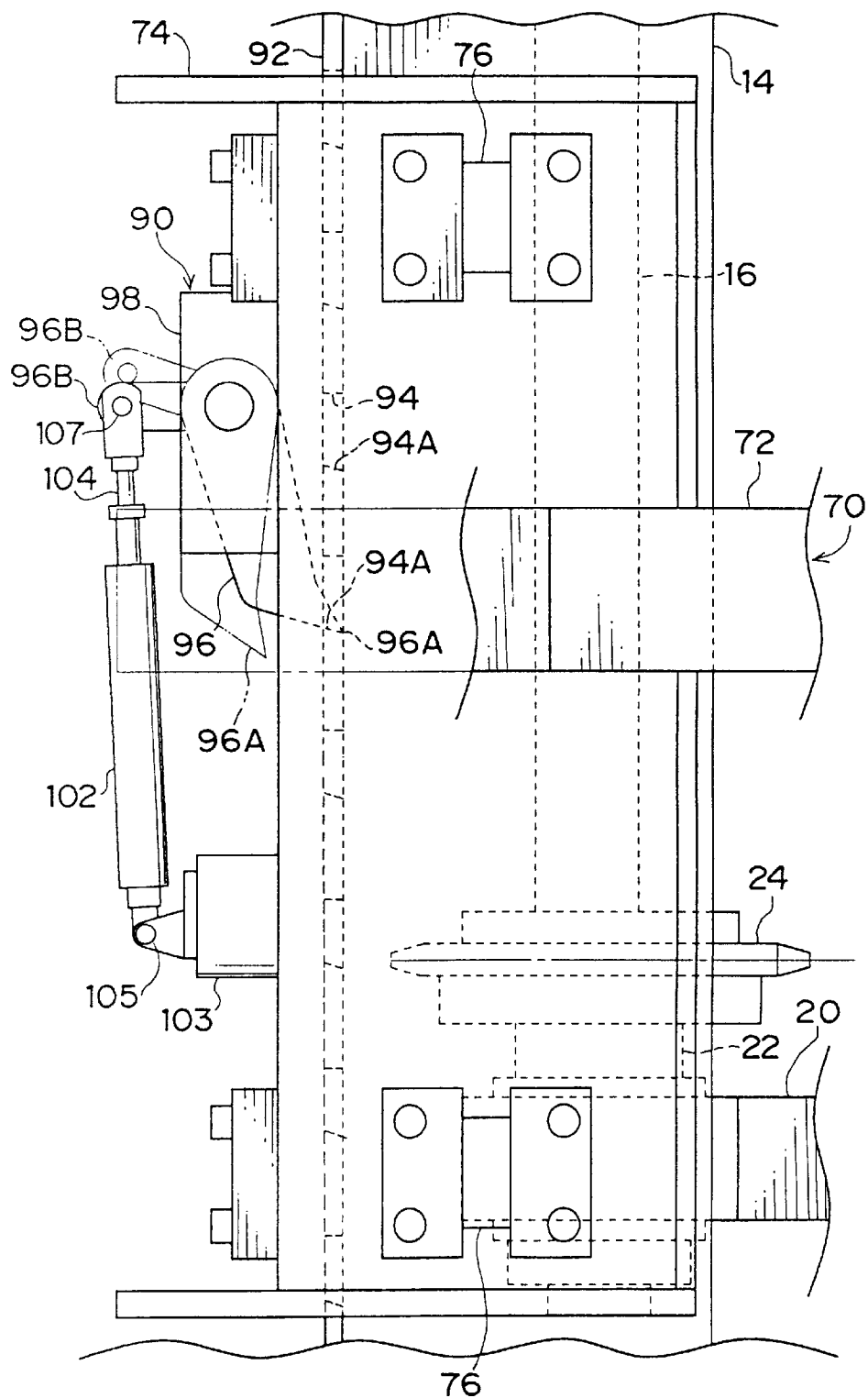
FIG. 10 is a side view, as seen from the rear, of the vicinity of the supporting portion of the second sub-base.

As illustrated in FIG. 9 and FIG. 10, the second sub-base 70 includes a lock device 90 at each supporting portion 74. A lock plate 92 is provided at each supporting pillar 14 corresponding to respective supporting portions 74.

The lock plate 92 is formed so as to be long in the vertical direction, and a plurality of square holes 94 are formed in the lock plate 92 in the vertical direction at uniform intervals.

The lock device 90 includes a lock lever 96 which engages with the square holes 94.

The intermediate portion of the lock lever 96 is supported and is swingable at a shaft receiving portion 98 fixed to the supporting portion 74. A vicinity of a lower end 96A of the lock lever 96 can be inserted into the square holes 94.

A lower end 94A of the square hole 94 is formed so as to be inclined slightly downward toward the inner side thereof (the supporting pillar 14 side thereof) from the outer side thereof. The lower surface in the vicinity of the lower end 96A of the lock lever 96 is formed so as to contact in parallel the lower end 94A of the square hole 94 in a state in which the lower end 96A of the lock lever 96 is inserted into the square hole 94. When load is applied to the lock lever 96, the lock lever 96 receives the force in the direction in which the lower end 96A thereof enters into the square hole 94.

The lock device 90 includes a double-acting air cylinder 102 (i.e., an air cylinder of the type having, at both sides of the piston, an air chamber into which air is made to enter and from which air is made to leave).

The main body of the air cylinder 102 is supported via a pin 105 at a supporting member 103 of the supporting portion 74, such that the air cylinder 102 is swingable.

A distal end of a piston rod 104 of the air cylinder 102 is connected via a pin 107 to an upper end 96B of the lock lever 96.

Figure 15:
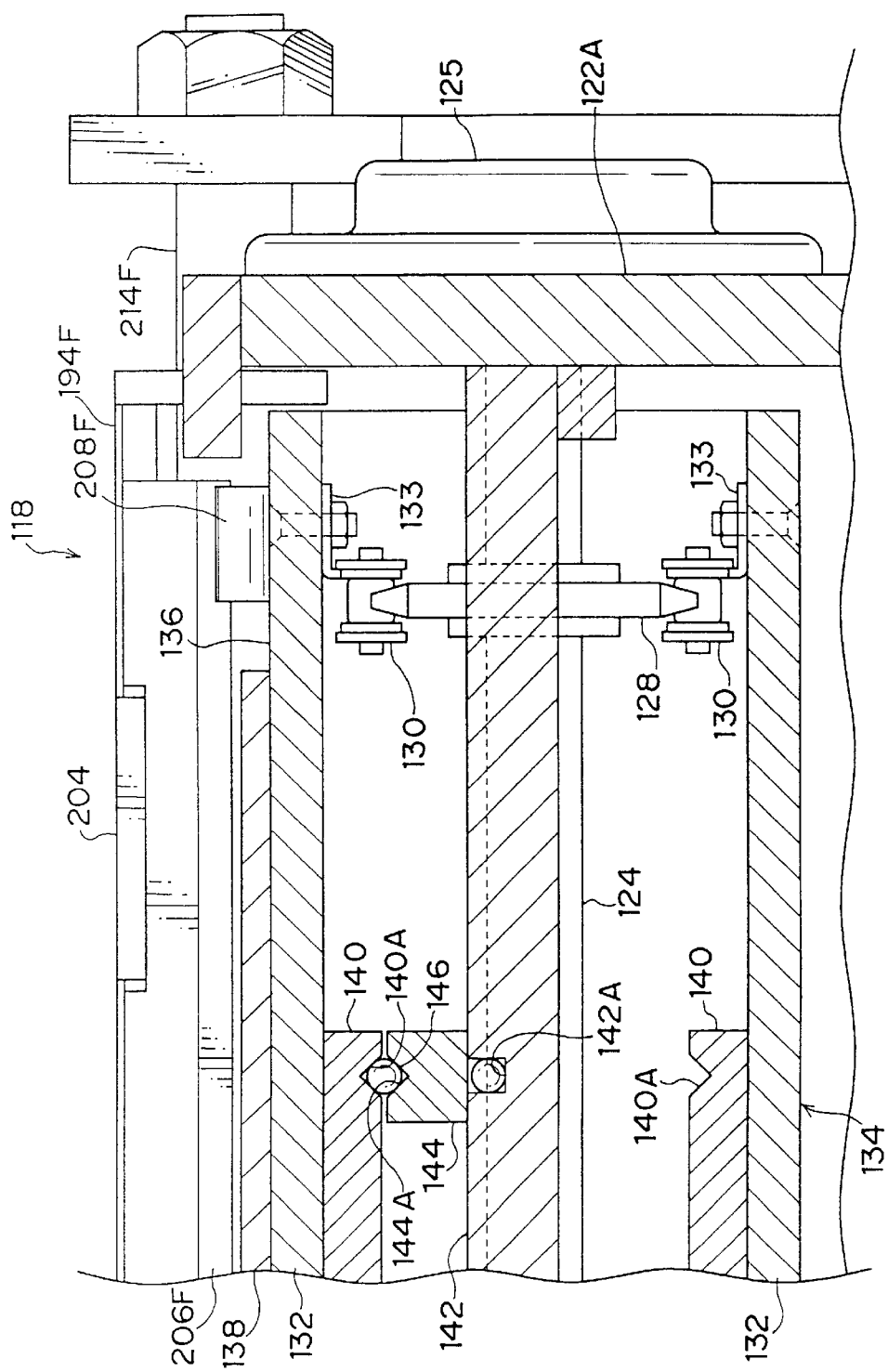
FIG. 15 is a cross-sectional view of a portion of the tire driving device.

A solenoid valve, a pressure regulating valve, an air compressor and the like (all not shown in the drawings) are connected to the air cylinder 102. The operation of the solenoid valve and the air compressor is controlled by a control device 126 which is shown in FIG. 15.

The control device 126 can be formed by, for example, a microcomputer. A display device 126A, which is a CRT or the like for displaying the values measured by a force sensor 152 which will be described later and for displaying the adjustment direction of the positional angle of the wheel 302 and the like, is connected to the control device 126.

Usually, the air cylinder 102 urges the lock lever 96, by air pressure, in a direction in which the bottom end 96A of the lock lever 96 approaches the lock plate 92.

Accordingly, when the loading stand 18 is raised such that the second sub-base 70 rises, the lower end 96A of the lock lever 96 engages successively with the plurality of square holes 94 while sliding along the lock plate 92 or the side surface of the supporting pillar 14. When the loading stand 18 is lowered, the lower end 96A of the lock lever 96 is inserted into the square hole 94 and the lower end 96A catches on the lower end 94A (the state illustrated by the dotted line in FIG. 10) such that the lowering of the second sub-base 70 is stopped and only the loading stand 18 is lowered.

When the second sub-base 70 is lowered together with the loading stand 18, first, the second sub-base 70 is supported and lifted slightly from below by the loading stand 18. The lower end 96A of the lock lever 96 moves upward so as to separate from the lower end 94A of the square hole 94 of the lock plate 92, and the lock lever 96 becomes slidable. In this state, the air cylinder 102 is operated and the lock lever 96 rotates so that the lower end 96A comes out from the square hole 94.

Next, when the lower end 96A of the lock lever 96 is maintained in the state of being out of the square hole 94 and the loading stand 18 is lowered, the second sub-base 70 can be lowered together with the loading stand 18 while in a state of being loaded on the loading stand 18.

Tire Driving Device

As shown in FIGS. 11 through 14, a tire driving device 118 includes a frame 122 which is formed by a pair of main frames 122A and side plates 122B. The pair of main frames 122A are disposed parallel to each other at a predetermined interval, and the side plates 122B span between the end portions of the pair of main frames 122A.

The frame 122 is disposed so that the longitudinal direction of the main frames 122A is in the direction of arrow F and the direction of arrow B.

A pair of driving shafts 124 span between the pair of main frames 122A in the vicinities of the respective side plates 122B. The pair of driving shafts 124 are axially supported at the main frames 122A via shaft receiving portions 125 so as to be rotatable.

Figure 22:
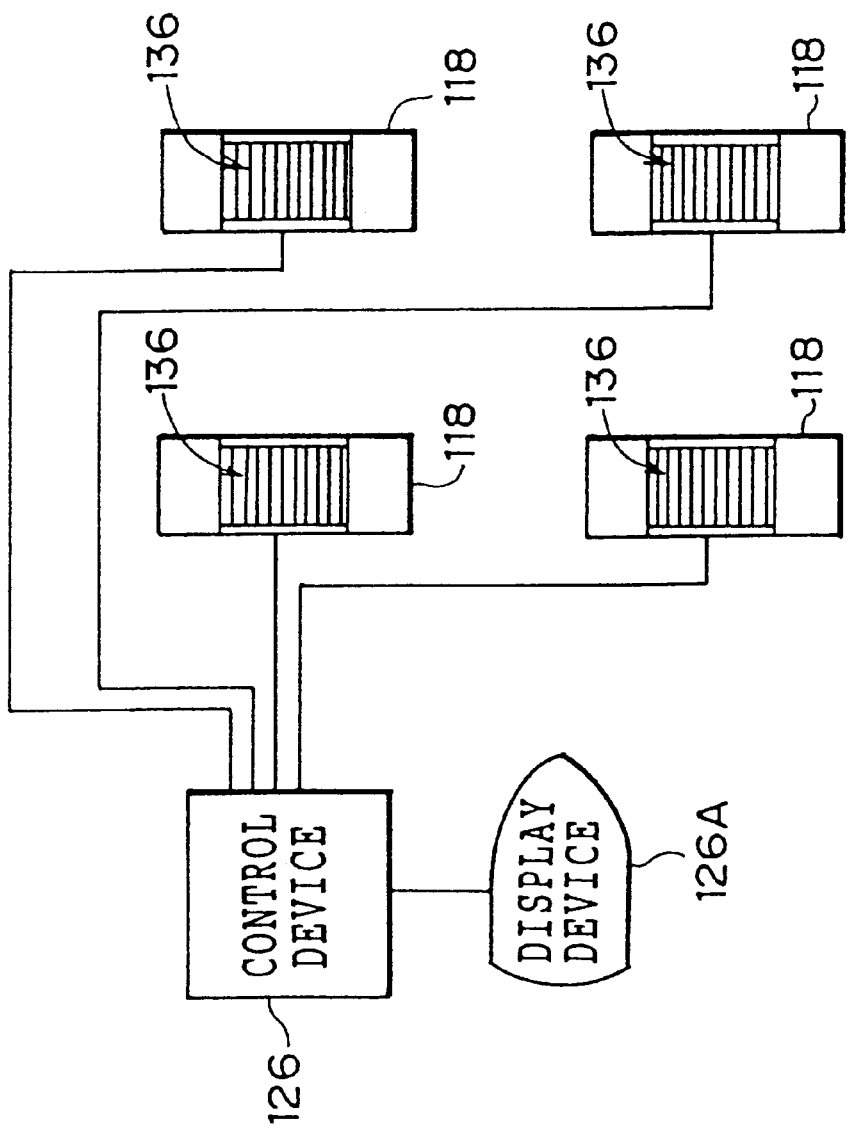
FIG. 22 is a schematic structural view of a control system of the wheel alignment adjusting device.

One end of the arrow B direction side driving shaft 124 is connected to a rotational shaft of a motor 127, whose driving is controlled by a control device 126 (see FIG. 22). The motor 127 is connected to the frame 122 via an attachment hardware tool 129.

Two sprockets 128 are attached to one of the pair of driving shafts 124 so that the sprockets 128 oppose two sprockets 128 which are attached to the other driving shaft 124.

Two sets of endless chains 130 span between the pair of driving shafts 124.

Figure 14:
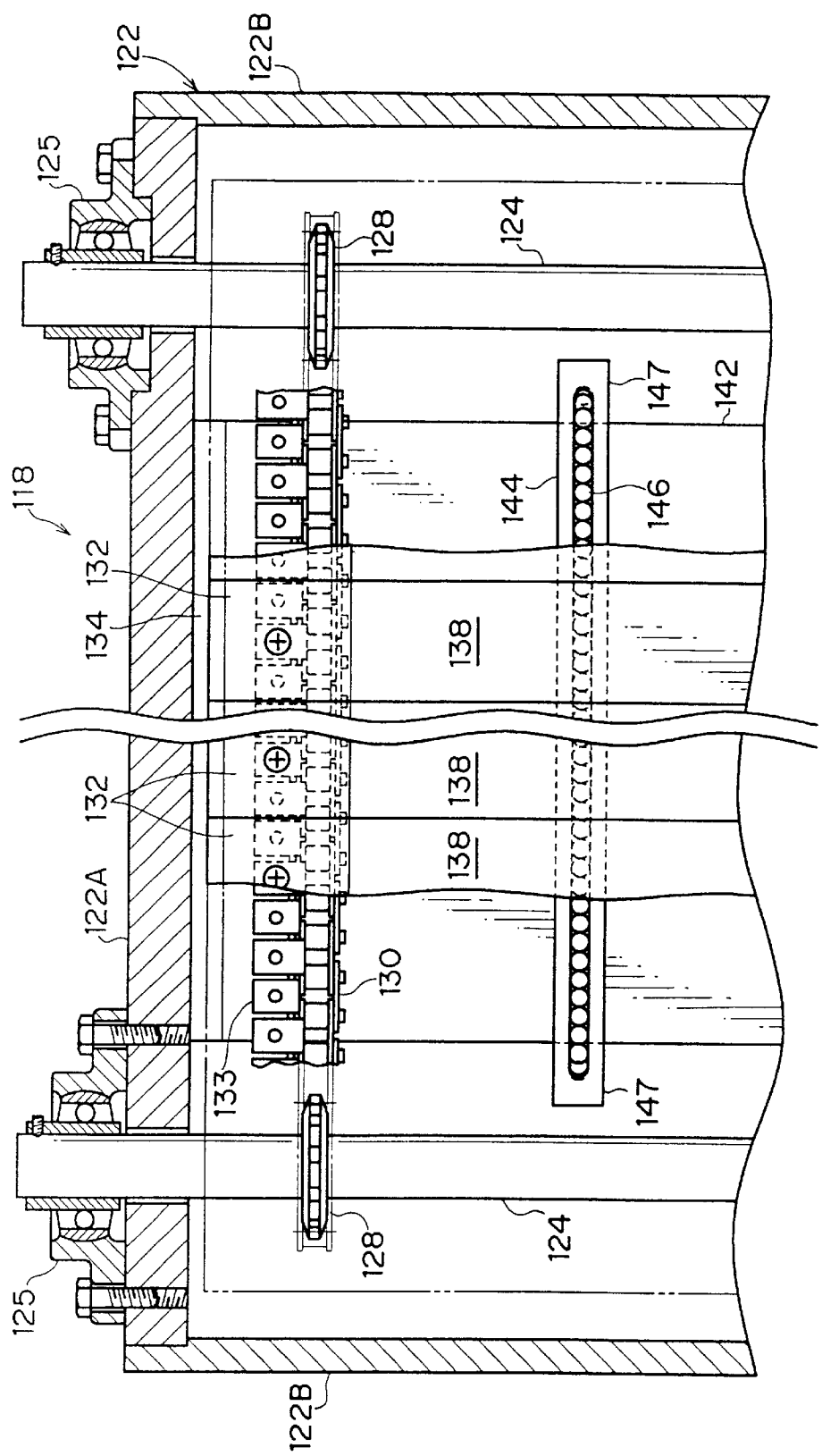
FIG. 14 is a cross-sectional view of a portion of the tire driving device.

As shown in FIG. 14, the two sets of endless chains 130 are respectively trained around the opposing pair of sprockets 128 (FIG. 14 shows only one set).

In this way, the driving force generated at the motor 127 is transmitted to the driving shaft 124 at the arrow B direction side, and when the driving shaft 124 at the arrow B direction side rotates, the two sets of chains 130 are respectively rotated via the sprockets 128 and the pair of driving shafts 124 are respectively rotated.

As shown in FIGS. 12 and 14, the tire driving device 118 includes a plurality of long and thin aluminum plates 132. The plate 132 has a length which is sufficiently longer than the width of the tire, and has a width which is of an extent that does not permit the plate 132 to enter into the grooves of the tread pattern of the tire.

Figure 13:
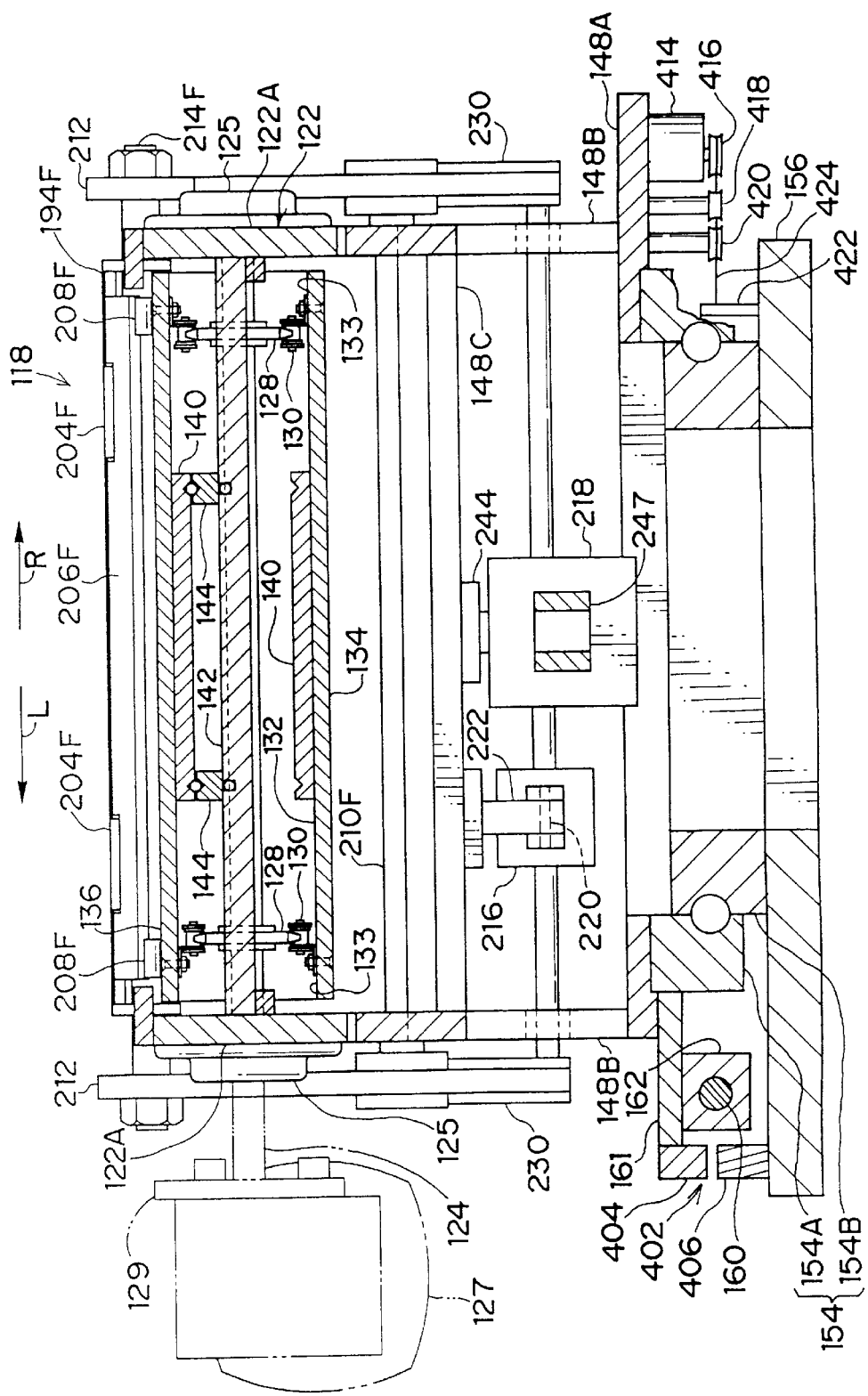
FIG. 13 is a cross-sectional view of the tire driving device.

The plurality of plates 132 are parallel to the side plates 122B and are disposed continuously in the longitudinal direction of the chains 130. As shown in FIGS. 13 to 15, the end portions of the plates 132 are respectively attached to the two sets of chains 130 via connecting members 133.

Figures 16A, 16B:
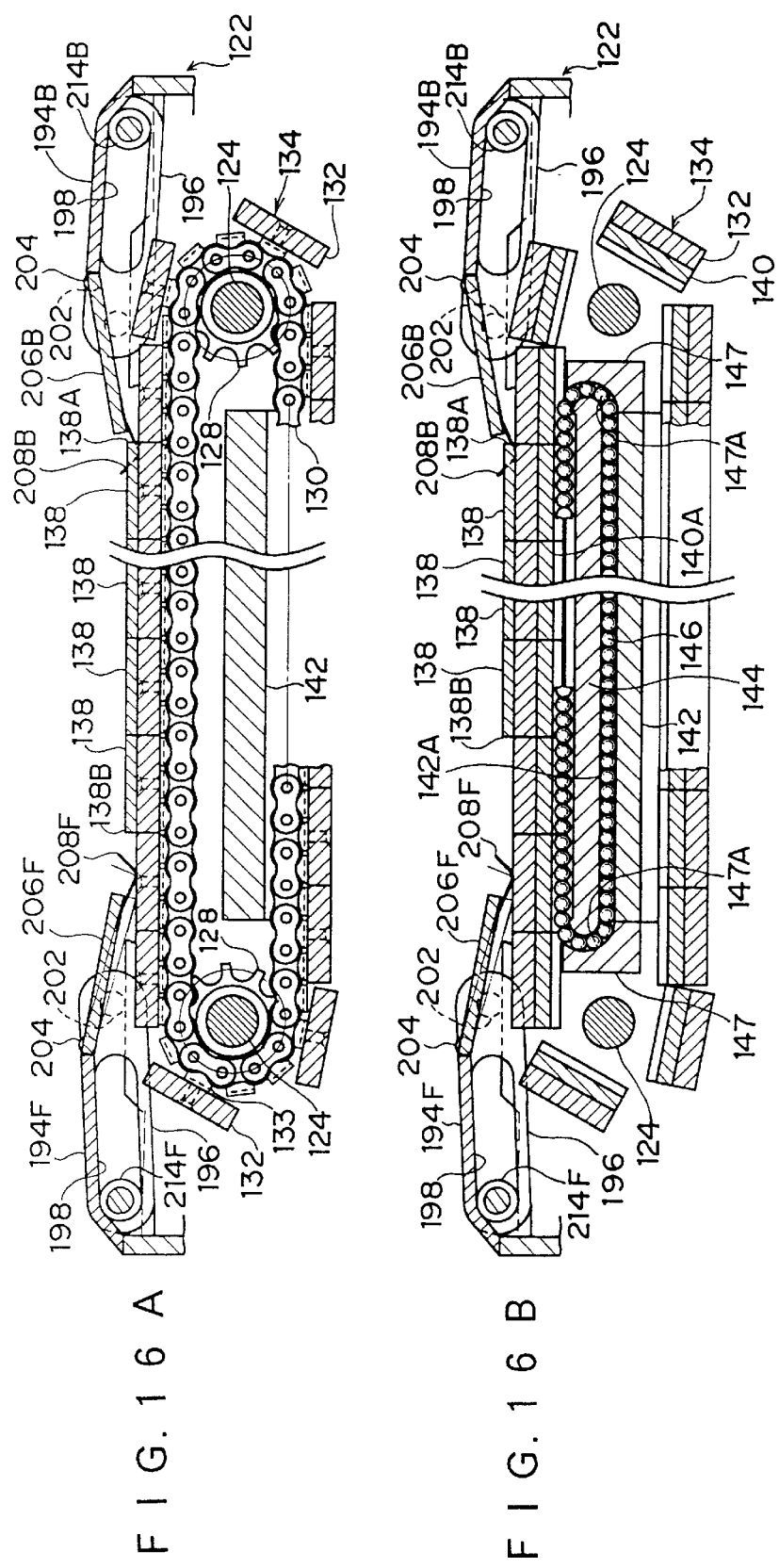
FIG. 16A is a cross-sectional view of an endless track of the tire driving device in vicinities of sprockets.
FIG. 16B is a cross-sectional view of the endless track of the tire driving device along a circulating path of steel balls.

Accordingly, as shown in FIG. 16A, an endless track 134 is formed by connecting the plurality of plates 132 by the chains 130 and the connecting members 133 in the transverse direction of the plates 132. The endless track 134 spans between the pair of driving shafts 124 so that the longitudinal direction of the plates 132 is oriented along the left and right directions of a vehicle 300.

Because the pair of driving shafts 124 are supported at the frame 122, the endless track 134 is supported at the frame 122 so as to be able to be driven to circulate.

Hereinafter, the surface which is formed by the upper surfaces of the plurality of plates 132, as seen from above the tire driving device 118, is referred to as a tire driving surface 136.

As shown in FIGS. 12, 16A, and 16B, a plurality of plate-shaped projections 138 having a predetermined height are formed on the outer surface of the endless track 134 in the circulating direction thereof.

The respective projections 138 are formed on the upper surfaces of the plurality of plates 132 so that the projections 138 are continuous in the circulating direction of the endless track 134.

As shown in FIG. 12, a length L1 of each projection 138 in the transverse direction (the circulating axial direction, the direction of arrow R and the direction of arrow L) of the endless track 134 is set to be longer than the width of the tire and is set to be shorter than a length LO of the plate 132. Namely, the surfaces of the plates 132 are exposed (continuously in the circulating direction) at the transverse direction sides of the endless track 134.

When the endless track 134 is driven and circulated, the respective plates 132 move in the circulating direction. As shown in FIGS. 16A and 16B, in a state in which the plurality of plates 132, at which the projections 138 are respectively formed, are moved to positions corresponding to the tire driving surface 136, since the upper surfaces of the plurality of plates 132 are flush with each other, the upper surfaces of the plurality of projections 138 are also flush and continuous. Accordingly, a projecting portion which is continuous over a predetermined length (as an example, a length which is substantially twice or three times the length (ground-contact length) of a wheel 302, which is loaded on the tire driving surface 136, in the circulating direction of the ground-contact portion of the tire) in the circulating direction of the endless track 134 is formed.

Hereinafter, between edges of the ends of this projecting portion (the projecting portion formed by the plurality of projections 138) in the circulating direction of the endless track 134, the edge at which the wheel 302 rides up from the tire driving surface 136 (an edge on the tire driving surface 136 in the circulating direction (the direction of arrow B) of the endless track 134) is referred to as an up-step 138A, and the edge which is on the side opposite the above-described edge is referred to as a down-step 138B.

Due to the above-described structure, when the endless track 134 is driven and circulated in a state in which the wheel 302 of the vehicle 300 is loaded on the tire driving surface 136, as shown in FIG. 8, the wheel 302 rolls on the tire driving surface 136 in the direction of arrow B, passes over the up-step 138A from the upper surface of the plate 132, and rides up onto the upper (top) surface (projecting surface) of the projecting portion. Next, the wheel 302 passes over the down-step 138B from the upper surface of the projecting portion and comes down off onto the upper surface (reference surface) of the plate 132. These actions repeatedly carried out.

As shown in FIGS. 13, 15, and 16B, a flat plate guides 140 are mounted on the surface of each plate 132, which surface corresponds to the inner side of the endless track 134. A V-shaped engagement groove 140A is formed at this flat plate guide 140 in the circulating direction of the endless track 134.

Further, a load receiving plate member 142 is disposed so as to span between the pair of main frames 122A, and the end portions of the load receiving plate member 142 are fixed to the inner surfaces of the pair of main frames 122A. Guide members 144 are fixed to the upper surface of the load receiving plate member 142 at positions which oppose the flat plate guides 140.

In the upper surfaces of the guide members 144, a V-shaped receiving groove 144A is formed, in the circulating direction of the endless track 134, at a position which opposes the engagement groove 140A.

A plurality of steel balls 146 having the same size are disposed between the engagement grooves 140A and the receiving grooves 144A.

Accordingly, even if the wheel 302 of the vehicle 300 is loaded on the tire driving surface 136 and load is applied to the plates 132 forming the endless track 134, the plurality of plates 132 forming the tire driving surface 136 are supported by the guide members 144 and the load receiving plate member 142 via the steel balls 146 so that the upper surfaces of the plates 132 are coplanar.

Moreover, as will be described later, when the endless track 134 is driven so as to roll the wheel 302 and the force in the circulating axial direction of the endless track 134 is thereby applied to the tire driving surface 136, the force is transmitted to the frame 122 via the flat plate guides 140, the steel balls 146, the guide member 144, and the load receiving plate member 142.

Further, rectangular grooves 142A are formed, in the circulating direction of the endless track 134, at portions of the upper surface of the load receiving plate member 142 which are covered by the guide members 144. Each rectangular groove 142A is of a size which allows the steel balls 146 to pass therethrough.

As shown in FIG. 16B, a passage forming member 147 is provided at each end portion of the load receiving plate member 142 in the circulating direction of the endless track 134. A U-shaped groove 147A is formed at the passage forming member 147 and connects in the shape of a U between a passage between the engagement groove 140A and the receiving groove 144A and a passage formed by the rectangular groove 142A. (Note that this explanation is an explanation of one side alone.)

When the endless track 134 circulates, the steel balls 146 circulate through the passage between the engagement groove 140A and the receiving groove 144A and the passage formed by the rectangular groove 142A via the U-shaped grooves 147A.

Supporting Frame

Figure 11:
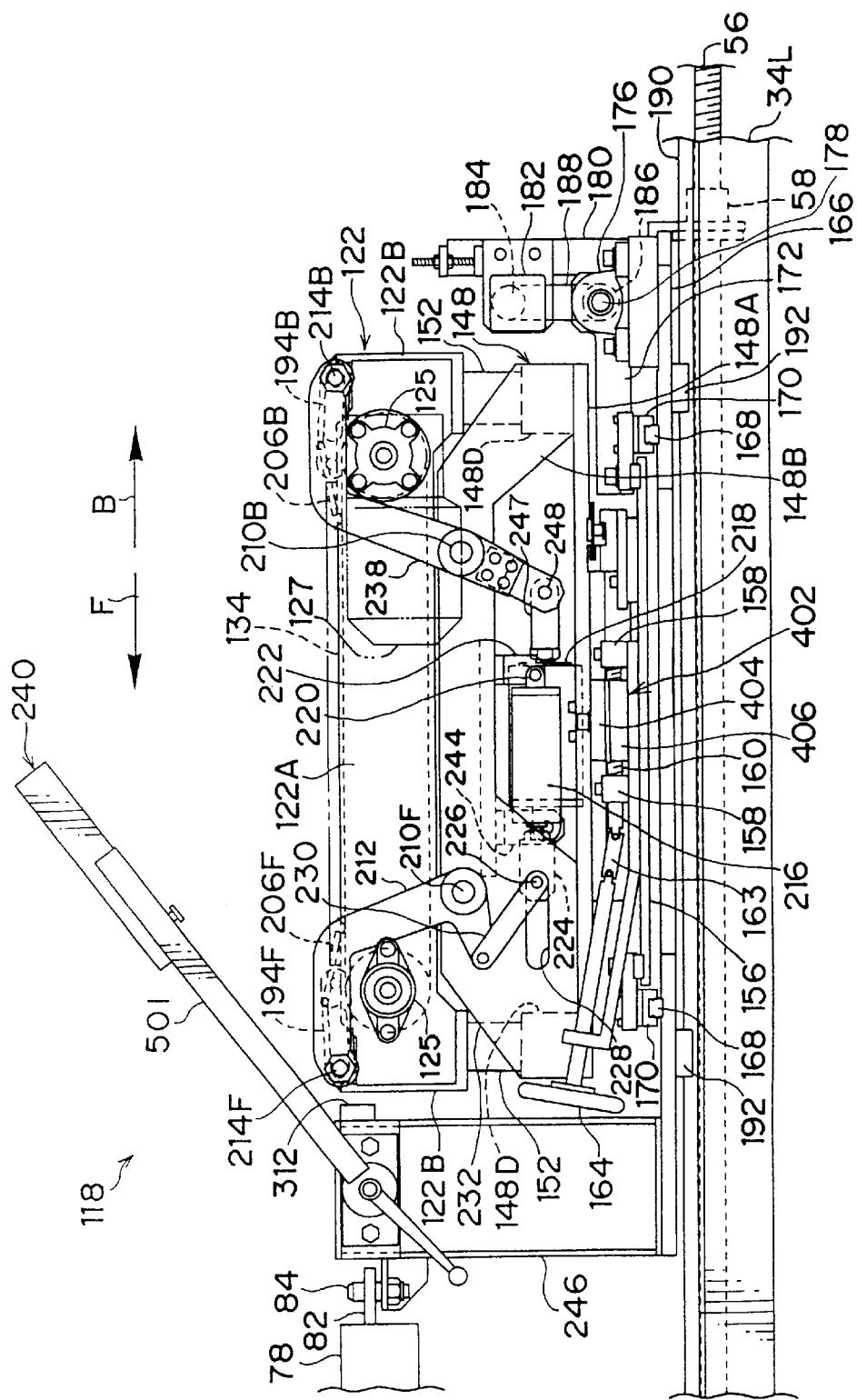
FIG. 11 is a side view, as seen from the left side, of a tire driving device.

As shown in FIGS. 11 and 13, a supporting frame 148 is disposed beneath the frame 122.

The supporting frame 148 includes a bottom portion 148A, a pair of supporting portions 148B, a shelf plate portion 148C, and a reinforcing portions 148D. The bottom portion 148A is disposed horizontally and is formed so as to be long in the circulating direction of the endless track 134. The pair of supporting portions 148B stand upright at the arrow L direction and arrow R direction end portions of the bottom portion 148A. The shelf plate portion 148C is disposed horizontally above the bottom portion 148A and spans between the pair of supporting portions 148B. The reinforcing portions 148D are disposed at front and rear sides of the upper portion of the bottom portion 148A and extend to the left and right.

As shown in FIG. 11, the aforementioned frame 122 is disposed on the supporting frame 148 via force sensors 152 (which will be described later in detail).

The force sensors 152 include force detecting elements such as a strain gauge, a load cell, or the like. The force sensors 152 can detect force in the longitudinal direction of the vehicle (the direction of arrow F and the direction of arrow B) and force in the left and right directions of the vehicle (the direction of arrow R and the direction of arrow L), which forces are applied to the frame 122 via the endless track 134.

Accordingly, when the endless track 134 is driven and circulated, the wheel 302 rolls on the endless track 134 and force in the circulating direction (longitudinal force) is thereby applied to the endless track 134, the force is transmitted to the frame 122 via the endless track 134 or the like, the frame 122 is displaced in the circulating direction with respect to the supporting frame 148, and the magnitude of the force in the circulating direction is measured by the force sensors 152.

Further, when the wheel 302 rolls on the endless track 134 and force in the circulating axial direction (lateral force) is thereby applied to the endless track 134, the force is transmitted to the frame 122 via the flat plate guides 140, the steel balls 146, the guide members 144, and the load receiving plate member 142, the frame 122 is displaced in the circulating axial direction with respect to the supporting frame 148, and the magnitude of the force in the circulating axial direction is measured by the force sensors 152.

The force sensors 152 are connected to the control device 126 and the results of measurement are output to the control device 126.

As shown in FIG. 13, an outer ring 154A of a bearing 154 whose axial direction is vertical is fixed to the central lower surface of the bottom portion 148A. An inner ring 154B of the bearing 154 is fixed to the upper surface of a transverse direction moving base plate 156, which is disposed horizontally beneath the bottom portion 148A. In this way, the supporting frame 148 is rotatable with respect to the transverse direction moving base plate 156.

Figure 18:
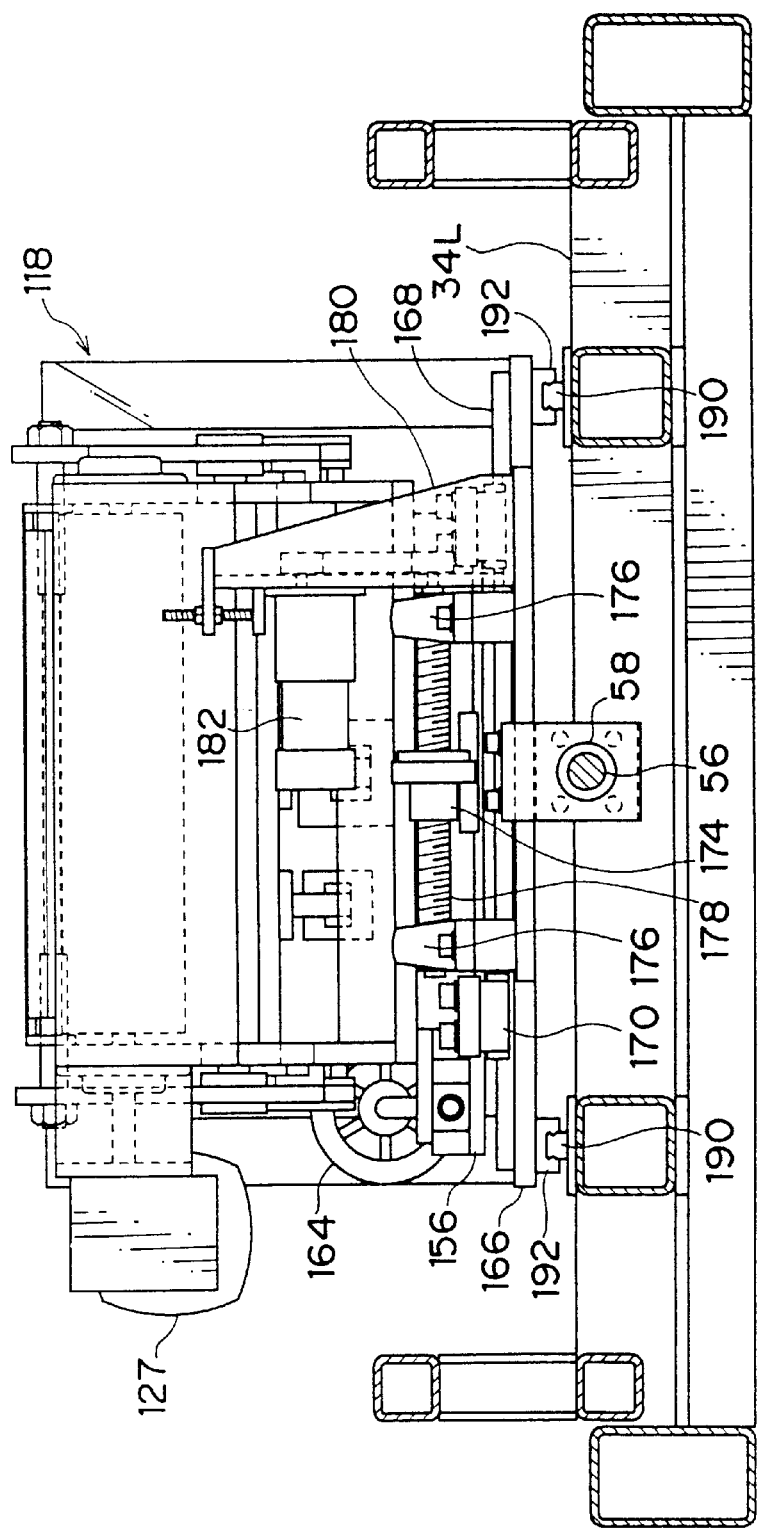
FIG. 18 is a side view, as seen from the rear, of the tire driving device.

As shown in FIGS. 11, 17, and 18, a feed screw 160, which is supported at shaft receiving portions 158, is provided on the upper surface of the transverse direction moving base plate 156.

A nut 162, in which a female screw (not shown in the drawings) is formed, is connected via an attachment hardware 161, to the bottom portion 148A of the supporting frame 148. The feed screw 160 of the transverse direction moving base plate 156 is screwed into the female screw of the nut 162.

A handle 164 is mounted to one end of the feed screw 160 via a joint 163. When this handle 164 is rotated, the nut 162 moves in the longitudinal direction of the feed screw 160 and the supporting frame 148 and the frame 122 rotate.

Rotational Angle Detecting Means and Reference Position Detecting Means (Device)

The tire driving device 118 is provided with a rotational angle detecting means 400 and a reference position detecting means 402. The rotational angle detecting means 400 detects a rotational angle (relative angle) of the supporting frame 148 with respect to the transverse direction moving base plate 156. The reference position detecting means 402 detects a reference position of the supporting frame 148 in the rotating direction with respect to the transverse direction moving base plate 156.

Figure 28:
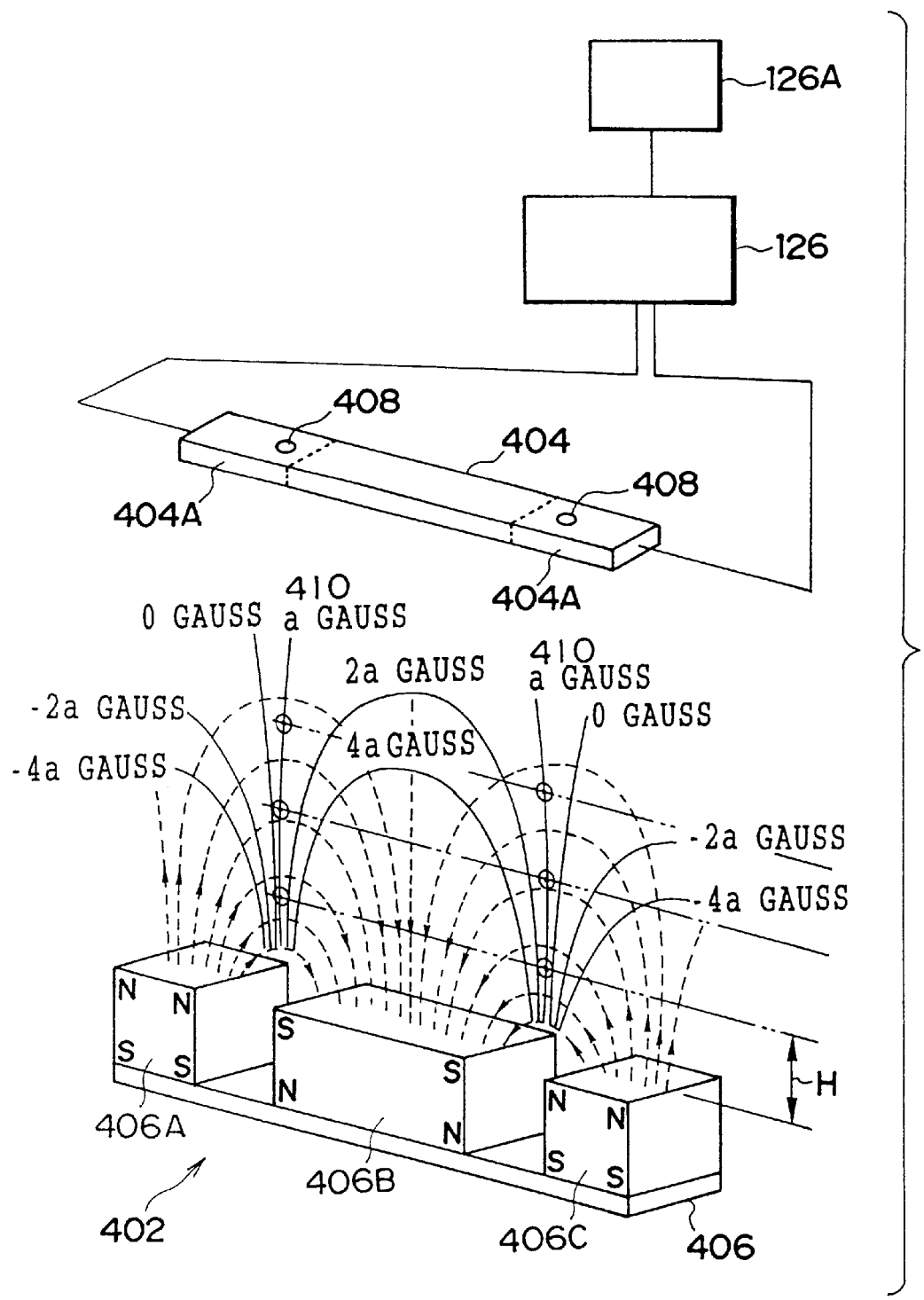
FIG. 28 is a perspective view of a main portion of a reference position detecting means.

As shown in FIG. 28, the reference position detecting means 402 includes a sensor unit 404 and a magnet unit 406.

Two sensors (hole elements) 404A are provided at the sensor unit 404 with an interval therebetween.

In the present embodiment, AH-002-S manufactured by Asa Electronic Industries Inc. is used for the sensors 404A, and AG-001G manufactured by Asa Electronic Industries Inc. is used for the magnet unit 406.

An LED 408 is provided integrally with each of the sensors 404A. The sensors 404A and the LEDs 408 are connected to the control device 126.

As shown in FIGS. 13 and 17, the sensor unit 404 is mounted to a distal end of the attachment hardware 161 in parallel with the transverse direction moving base plate 156.

On the other hand, the magnet unit 406 is mounted to the transverse direction moving base plate 156 so as to oppose the sensor unit 404.

As shown in FIG. 28, three magnets, short magnet 406A, long magnet 406B, and short magnet 406C are provided at the magnet unit 406 with intervals therebetween. There is a line 410 ("a" gauss), which is formed by connecting points of the magnetic fluxes at which points the directions of the magnetic fluxes are parallel to the direction of alignment of the three magnets, is formed between each of magnet 406A and magnet 406B, and magnet 406B and magnet 406C.

When the lines 410 (the points) are detected, the LEDs 408 are lit.

Further, the positions of the sensors 404A are determined in accordance with the intervals of the lines 410. In the present embodiment, when the one sensor 404A detects the one line 410 and the other sensor 404A detects the other line 410 (i.e., when the two LEDs 408 are lit simultaneously), the supporting frame 148 is at the reference position (zero point; at this time, the circulating direction of the endless track 134 is parallel to the longitudinal direction (the direction of arrow F and the direction of arrow B) of the vehicle) is determined.

As shown in FIGS. 13 and 17, the rotational angle detecting means 400 includes a rotary encoder 414. The rotary encoder 414 is mounted to a lower surface of the bottom portion 148A of the supporting frame 148, and a pulley 416 is attached to a rotational shaft (not shown in the drawings) of the rotary encoder 414.

The rotary encoder 414 of the present embodiment is a type of encoder which generates 5000 pulses when the rotational shaft is rotated once (is rotated 360°). However, another type of encoder may be used provided that the rotational angle can be measured precisely.

Moreover, on the lower surface of the bottom portion 148A and in the vicinity of the rotary encoder 414, a pair of pulleys 418 are attached with the rotary encoder 414 at the center thereof and with an interval in the direction of arrow F and the direction of arrow B therebetween. Further, at the positions further away from the rotary encoder 414, a pair of pulleys 420 are attached with the rotary encoder 414 at the center thereof and with an interval in the direction of arrow F and the direction of arrow B therebetween.

A pair of wire anchoring pins 422 are mounted to the transverse direction moving base plate 156 with the rotary encoder 414 substantially at the center thereof and with an interval in the direction of arrow F and the direction of arrow B therebetween.

A wire 424 is anchored on the wire anchoring pins 422 and an intermediate portion of the wire 424 is trained around the pulley 420, the pulley 418, the pulley 416 of the rotary encoder 414, the pulley 418, and the pulley 420. The wire 424 is wound at least around a portion of the periphery of the pulley 416 of the rotary encoder 414.

As a result, when the supporting frame 148 is rotated with respect to the transverse direction moving base plate 156, the pulley 416 of the rotary encoder 414 rotates.

A radius (r) of the pulley 416 of the rotary encoder 414 is set extremely small with respect to a distance (R) from the rotational center of the bearing 154 to the wire anchoring pin 422. Thus, when the supporting frame 148 rotates with respect to the transverse direction moving base plate 156, the rotational angle of the pulley 416 is extremely large with respect to the rotational angle of the supporting frame 148. Namely, the rotational angle of the pulley 416 is made to be large, while the rotational angle of the supporting frame 148 is small. (i.e., the rotational angle is "magnified".) Consequently, even a small change in the angle of the supporting frame 148 can be measured accurately and precisely. (In the present embodiment, the rotational angle of the supporting frame 148 can be measured up to five seconds.)

Moreover, a display device 126A displays the direction and the angle over which the supporting frame 148 has rotated from the aforementioned reference position (the zero point, i.e., when the two LEDs 408 are lit simultaneously). (For example, plus is displayed when the supporting frame 148 is rotated in a right direction and minus is displayed when the supporting frame 148 is rotated in a left direction.)

A longitudinal direction moving base plate 166 is disposed horizontally beneath the transverse direction moving base plate 156.

As shown in FIGS. 11 and 12, a pair of guide rails 168 for left and right sliding which extend in the direction of arrow R and the direction of arrow L (the left and right directions of the vehicle) are mounted on the upper surface of the longitudinal direction moving base plate 166.

A linear shaft receiving portion 170 is sidably supported at each of the guide rails 168 for left and right sliding. The transverse direction moving base plate 156 is attached to the linear shaft receiving portions 170.

Accordingly, the transverse direction moving base plate 156 is supported so as to be movable in the left and right directions of the vehicle along the guide rails 168 for left and right sliding with respect to the longitudinal direction moving base plate 166.

As shown in FIG. 17, a bracket 172 is attached to the transverse direction moving base plate 156 so as to protrude toward the arrow B direction side. A female screw (not shown in the drawings), which is formed along the left and right directions of the vehicle, is formed at a nut 174 and the nut 174 is attached to a distal end portion of the bracket 172.

A feed screw 178, which is rotatably supported by shaft receiving portions 176, is provided at the longitudinal direction moving base plate 166. The female screw of the nut 174 is screwed with the feed screw 178.

The longitudinal direction moving base plate 166 includes a motor 182 which is mounted to a bracket 180.

A pulley 184 is mounted to a rotational shaft (not shown in the drawings) of the motor 182. A pulley 186 is mounted to the one end of the feed screw 178 which opposes the pulley 184.

An endless timing belt 188 is trained around the pulley 184 and the pulley 186.

The motor 182 is connected to the control device 126 (see FIG. 22). The driving of the motor 182 is controlled by the control device 126.

In this way, when the motor 182 is driven and the feed screw 178 is rotated, the transverse direction moving base plate 156, the frame 122, the supporting frame 148, and the like integrally move in the left and right directions of the vehicle with respect to the longitudinal direction moving base plate 166.

Further, when the driving of the motor 182 is stopped, the movement of the transverse direction moving base plate 156 and the like in the left and right directions of the vehicle with respect to the longitudinal direction moving base plate 166 is prevented due to the operation of the feed screw 178 and the nut 174 (locked state).

As shown in FIGS. 11 and 18, a pair of guide rails 190 for longitudinal sliding, which extend parallel to one another in the direction of arrow F and the direction of arrow B, are mounted to each the arrow B direction side of the upper surfaces of the first sub-base 34R and the first sub-base.

A plurality of linear shaft receiving portions 192, which fit together with the guide rails 190 for longitudinal sliding, are mounted to the lower surface of the longitudinal direction moving base plate 166. The tire driving devices 118 at the arrow B direction side are supported so as to be movable in the longitudinal direction of the vehicle with respect to the first sub-base 34L and the first sub-base 34R.

The nut 58, which screws together with the feed screw 56, is mounted to the longitudinal direction moving base plate 166 of the movably supported tire driving device 118. As a result, by rotating the feed screw 56 as described previously, the movably supported tire driving device 118 can be moved in the longitudinal direction.

Figure 19:
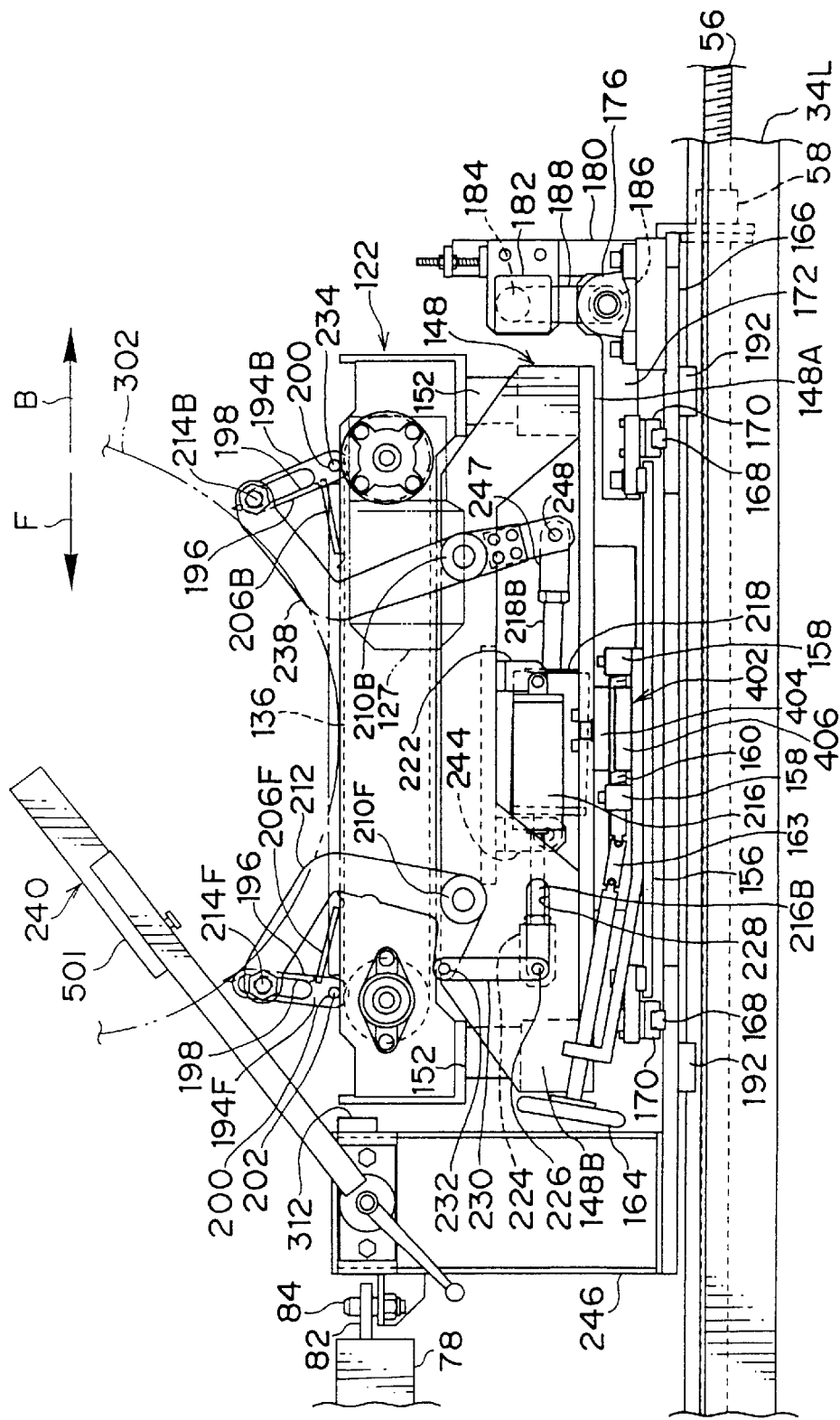
FIG. 19 is a side view, as seen from the left side of the tire driving device, illustrating a state in which wheel stopping plates are inclined.

Usually, among the four tire driving devices 118, the circulating and proceeding directions of the endless tracks 134 of the arrow F direction side pair of tire driving devices 118, on which the front wheels of the vehicle 300 are loaded, are parallel to each other. The circulating and proceeding directions of the endless tracks 134 of the arrow B direction side pair of tire driving devices 118, on which the rear wheels of the vehicle 300 are loaded, are also parallel to each other. The circulating and proceeding directions of the endless tracks 134 of the tire driving devices 118, on which the front wheels are loaded, are the same as those of the endless tracks 134 of the tire driving devices 118, on which the rear wheels are loaded. Wheel Stopper As shown in FIGS. 16, 19, and 20, a wheel stopping plate 194F is provided at the frame 122 at the arrow F direction side and a wheel stopping plate 194B is provided at the frame 122 at the arrow B direction side with the tire driving device 118 therebetween.

A narrow side plate 196 is formed integrally with each of the wheel stopping plate 194F and the wheel stopping plate 194B at each of the transverse direction sides of the vehicle. A long hole 198 and a pin hole 200 are formed in each of these four side plates 196.

A pin 202, which is provided at an upper end of the frame 122, is inserted into each of the pin holes 200 of the wheel stopping plate 194F. In this way, the wheel stopping plate 194F is swingable while the pins 202 serve as supporting points.

Further, an auxiliary plate 206F is connected via hinges 204F to the end portion of the wheel stopping plate 194F at the wheel stopping plate 194B side, and is parallel to the wheel stopping plate 194F.

The auxiliary plate 206F is swingable while the hinges 204F serve as supporting points.

On the reverse surface (the lower surface when disposed horizontally) of the auxiliary plate 206F, bent plate springs 208F are disposed in the vicinities of the vehicle transverse direction side of end portions of the plates 132 of the endless track 134 and at positions which do not interfere with the projections 138.

The one end sides of the plate springs 208F are fixed to the auxiliary plate 206F via screws or the like.

The other end sides of the plate springs 208F are spaced apart from the reverse surface of the auxiliary plate 206F by a predetermined dimension (larger than the height of the projections 138). As shown in FIG. 15, when the plate springs 208F abut the upper surfaces of the plates 132, the auxiliary plate 206F is supported in a state in which the auxiliary plate 206F is spaced apart from the projections 138 of the endless track 134. As a result, when the endless track 134 is driven, the projections 138 do not abut the auxiliary plate 206F.

Further, a shaft 210F which extends in the left and right directions of the vehicle is supported at the arrow F direction side of the supporting frame 148, and a shaft 210B which extends in the left and right directions of the vehicle is supported at the arrow B direction side thereof.

As shown in FIGS. 19 and 20, a link 212 is disposed at each side of the supporting frame 148 in the left and right directions of the vehicle.

The shaft 210F is inserted through holes (not shown in the drawings) which are formed at intermediate portions of the links 212, and as a result, the links 212 are supported swingably at the supporting frame 148.

An upper end of the link 212 at the arrow R direction side and an upper end of the link 212 at the arrow L direction side are connected by a connecting shaft 214F. This connecting shaft 214F penetrates sidably through the long holes 198 of the wheel stopping plate 194F.

As shown in FIGS. 11, 13, and 19, a first cylinder 216 is disposed at the supporting frame 148 at the arrow L direction side in the longitudinal direction of the vehicle, and a second cylinder 218 is disposed at the supporting frame 148 at the arrow R direction side in the longitudinal direction of the vehicle.

The first cylinder 216 is supported swingably at a bracket 222, in which an end portion of the cylinder body is attached to the shelf plate portion 148C of the supporting frame 148 via a pin 220.

A shaft receiving portion 224 is mounted to a distal end of a piston rod 216B of the first cylinder 216.

A slide shaft 226 which extends in the left and right directions of the vehicle is mounted to the shaft receiving portion 224.

The vicinities of ends of the slide shaft 226 penetrate through long holes 228, which are formed in side surfaces of the supporting frame 148 so as to be long in the longitudinal direction of the vehicle, and protrude further outward than the side surfaces of the supporting frame 148. The lower ends of short links 230 are connected to the protruded portions.

The upper ends of the short links 230 are connected to the lower ends of the links 212 via pins 232.

As a result, in a state in which the piston rod 216B of the first cylinder 216 is withdrawn and, as shown in FIG. 11, the slide shaft 226 is disposed at the arrow B direction side end portions of the long holes 228, the connecting shaft 214F, which is connected to the upper ends of the links 212, abuts the upper end of the frame 122 and the wheel stopping plate 194F is disposed substantially horizontally.

When the wheel 302 of the vehicle 300 passes over the wheel stopping plate 194F which is in a horizontal state, the load of the vehicle 300 is supported at the frame 122 and the supporting frame 148 via the wheel stopping plate 194F, the connecting shaft 214F, and the pins 202. (The same applies to the wheel stopping plate 194B.)

Next, when the wheel 302 of the vehicle 300 passes over the auxiliary plate 206F which is in a horizontal state, the auxiliary plate 206F receives the load and the plate springs 208F are deformed. An end portion of the auxiliary plate 206F at the side opposite the hinges 204F contacts the endless track 134, and the load is thereby supported at the wheel stopping plate 194F and the endless track 134. As shown in FIG. 16B, since the load receiving plate member 142 is disposed directly below the end portion of the auxiliary plate 206F at the side opposite the hinges 204F, the load which is transmitted to the end portion of the auxiliary plate 206F at the side opposite the hinges 204F is supported at the frame 122 and the supporting frame 148 via the endless track 134, the steel balls 146, the guide members 144, and the load receiving plate member 142.

As a result, the load of the vehicle 300 is not applied to the sprockets 128 and the driving shaft 124 for driving the chains 130, such that there is no worry that the sprockets 128 and the driving shaft 124 will be damaged.

Next, when the piston rod 216B of the first cylinder 216 protrudes and, as shown in FIG. 19, the slide shaft 226 is disposed at the arrow F direction side end portions of the long holes 228, the connecting shaft 214F, which is connected to the upper ends of the links 212, is spaced apart upwardly from the upper end of the frame 122. In this way, the wheel stopping plate 194F is raised and inclined.

On the other hand, the pin holes 200 of the wheel stopping plate 194B are formed at the wheel stopping plate 194F side of the wheel stopping plate 194B, and pins 234 which are provided at the upper ends of the frame 122 are inserted through the pin holes 200. In this way, the wheel stopping plate 194B is swingable while the pins 234 serve as supporting points.

Moreover, an auxiliary plate 206B is connected via hinges 204B to the end portion of the wheel stopping plate 194B at the wheel stopping plate 194F side, and is parallel to the wheel stopping plate 194B.

Although unillustrated, plate springs 208B, which are bent and formed in the same configuration as those of the auxiliary plate 206F, are also attached to a lower surface of the auxiliary plate 206B.

A shaft 210B of the supporting frame 148 is inserted into holes (not shown in the drawings) which are formed at intermediate portions of links 238. In this way, the links 238 are supported swingably at the supporting frame 148.

An upper end of the link 238 at the arrow R direction side and an upper end of the link 238 at the arrow L direction side are connected by a connecting shaft 214B. This connecting shaft 214B slidably penetrates through the long holes 198 of the wheel stopping plate 194B.

The second cylinder 218 which is disposed at the supporting frame 148 is supported swingably at a bracket 244, in which an end portion of the cylinder body is attached to the shelf plate portion 148C of the supporting frame 148 via a pin (not shown in the drawings).

A shaft receiving portion 247 is mounted to a distal end of a piston rod 218B of the second cylinder 218.

A shaft 248 which extends in the left and right directions of the vehicle is mounted to the shaft receiving portion 247.

The vicinities of ends of the shaft 248 protrude further outward than the side surfaces of the supporting frame 148, and the lower ends of the links 238 are connected to the protruded portions.

As a result, as shown in FIG. 11, when the piston rod 218B of the second cylinder 218 is withdrawn, the connecting shaft 214B which is connected to the upper ends of the links 238 is loaded on the upper end of the frame 122 and the wheel stopping plate 194B is disposed substantially horizontally.

Next, as shown in FIGS. 19 and 20, when the piston rod 218B of the second cylinder 218 protrudes, the connecting shaft 214B which is connected to the upper ends of the links 238 is spaced apart upwardly from the upper end of the frame 122, and thereby, the wheel stopping plate 194B is raised and inclined.

The driving of the first cylinder 216 and the second cylinder 218 is controlled by the control device 126 (see FIG. 22).

The imaginary line in FIG. 19 shows a case in which the wheel 302 is disposed on the tire driving surface 136 of the tire driving device 118. When the piston rod 216B of the first cylinder 216 and the piston rod 218B of the second cylinder 218 are protruded, the wheel stopping plate 194F and the wheel stopping plate 194B are respectively rotated such that the wheel 302 is caught therebetween from the front and rear. Accordingly, rolling of the wheel 302 in the longitudinal direction of the vehicle can be prevented.

Figure 21:
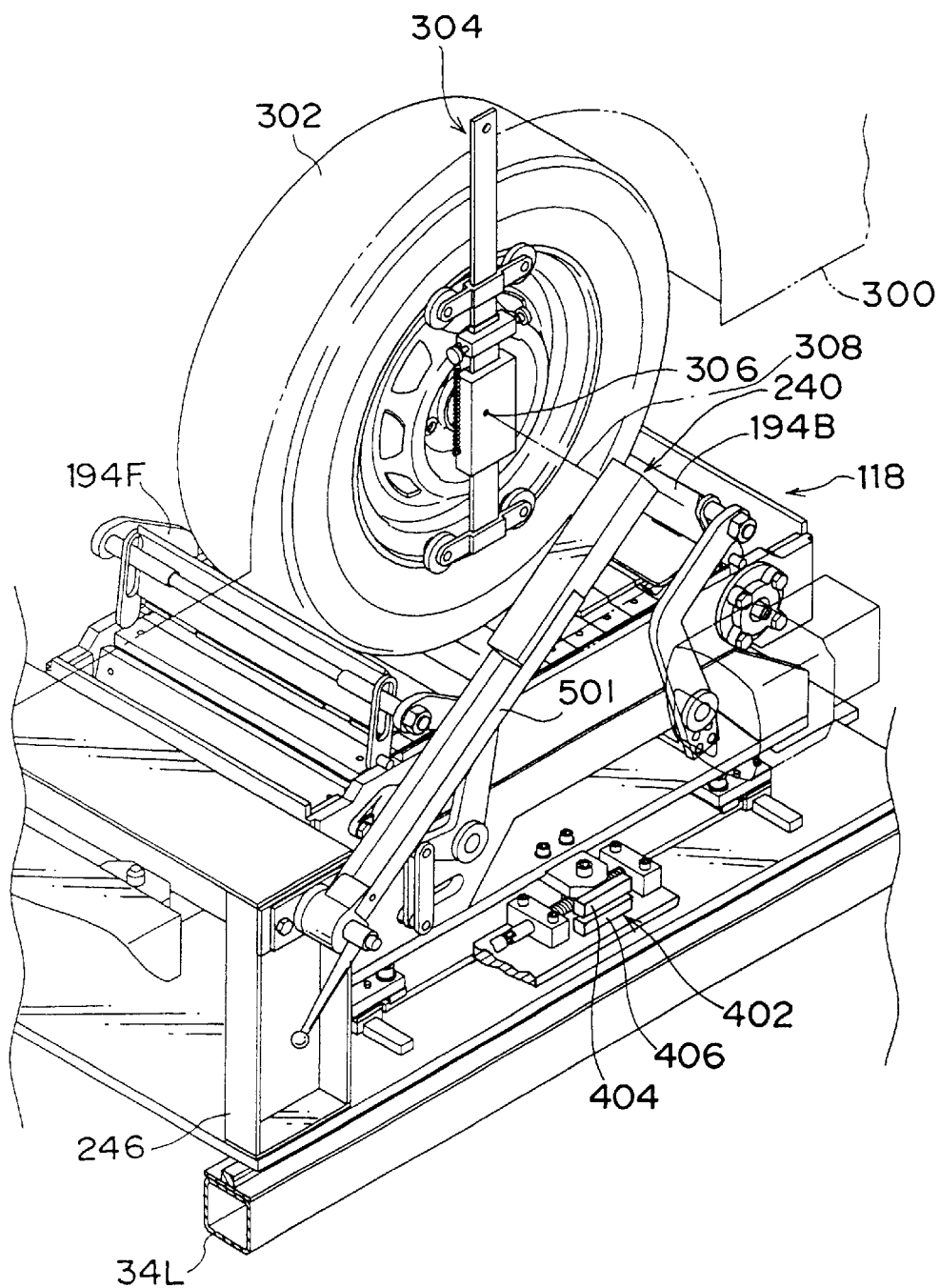
FIG. 21 is a perspective view of the tire driving device showing a state in which a wheel is fixed.

As shown in FIG. 21, a distance measuring device 240 is provided at each tire driving device 118.

The distance measuring device 240 includes a rod 501 which is formed by two members and is freely extendible and contractible. The rod 501 is rotatably supported at a side portion of a supporting stand 246 which stands upright at the longitudinal direction moving base plate 166 of the tire driving device 118. The rod 501 includes a distance measuring means (not shown in the drawings) for measuring the distance from an indication point 306 of a jig 304, which is mounted to the disk wheel and indicates the rotational axial center of the wheel 302, to the rod 501.

This distance measuring means is formed by a wire 308, an encoder, and the like. The wire 308 can be pulled out from a hole formed on the side surface of the rod 501 in a vicinity of a distal end thereof. The encoder measures the pulled-out amount of the wire 308. The encoder converts the pulled-out amount of the wire 308 into an electric signal, and outputs the results of measurement to the control device 126.

As shown in FIG. 6, a left and right connecting device 310 is provided at the two tire driving devices 118 at the arrow B direction side. The left and right connecting device 310 is formed by a flat steel member 312 and a fixable nipping device 314. One end of the flat steel member 312 is fixed to the tire driving device 118 at the arrow L direction side and extends in the arrow R direction. The fixable nipping device 314 is provided at the tire driving device 118 at the arrow R direction side and nips the other end of flat steel member 312 such that the fixable nipping device 314 and the flat steel member 312 are fixed each other.

Operation

Next, an example of a method of adjusting wheel alignment by using the above-described wheel alignment adjusting device 10 will be described.

(1) In the initial state of the wheel alignment adjusting device 10, as illustrated in FIG. 8, the loading stand 18 is lowered to the lowermost position, and the second sub-base 70 is disposed on the loading stand 18.

In this state, the pins 84 of the arrow B direction side movably supported tire driving devices 118 are inserted in the holes 80 of the plate members 82 provided at the end portions of the second transfer plates 78. The second transfer plates 78 connect the arrow F direction side tire driving devices 118 and the arrow B direction side tire driving devices 118. The upper surfaces of the second transfer plates 78 and the upper surfaces of the front and back tire driving devices 118 substantially coincide with one another.

The first transfer plates 68 are connected to the arrow B direction side end portion of the loading stand 18 and to the arrow B direction side tire driving devices 118. Thus, the top surfaces of the first transfer plates 68, the second transfer plates 78, and the front and back tire driving devices 118 substantially correspond to one another.

(2) An operator measures the wheel base and the front and rear tread bases of the vehicle 300 which is the object of adjustment. The operator changes the distance between the front and rear tire driving devices 118 in accordance with the wheel base, and changes the distance between the left and right tire driving devices 118 in accordance with the tread base.

The changing of the distance between the left and right tire driving devices 118 is carried out as follows.

(A) The solenoids 52 of the lock devices 50 are energized, the teeth 54 separate from the racks 48, and the first sub-base 34R is set in a movable state (unlocked state).

(B) The solenoid 46 is energized, and the wire rope 40 is grasped by the grasping claw 44.

(C) The handle 42 is rotated, the wire rope 40 is made to circulate, and the left/right positional adjustment of the first sub-base 34R is carried out in accordance with the tread base.

(D) The solenoid 46 is set in a non-energized state, and the grasping claw 44 releases the wire rope 40.

(E) The solenoids 52 of the lock devices 50 are set in a non-energized state, the teeth 54 engage with the racks 48, and the first sub-base 34R is locked at both the arrow F direction side end portion and the arrow B direction side end portion.

The changing of the distance between the left and right tire driving devices 118 is thus completed.

Here, in the wheel alignment adjusting device 10 of the present embodiment, either the left or the right tire driving devices 118 are fixed (the tire driving devices 118 provided at the first sub-base 34L are fixed), and the other tire driving devices 118 (those provided at the first sub-base 34R) are moved in the left and right directions. Thus, as compared with a case in which the tire driving devices 118 at both the left side and the right side are moved, the tire driving devices 118 can be positioned more accurately.

Further, the first sub-frame 34R is fixed to the main frame 19 (the racks 48) of the loading stand 18 by the lock devices 50 at both the arrow F direction side end portion and the arrow B direction side end portion of the first sub-base 34R. Thus, the positions of the tire driving devices 118 disposed on the first sub-base 34R do not move due to external force or the like.

Changing of the distance between the front and rear tire driving devices 118 is carried out as follows.

The motor unit 66 is driven such that the two arrow B direction side tire driving devices 118 are moved forward or backward. The distance between the arrow F direction side tire driving devices 118 and the arrow B direction side tire driving devices 118 is thus adjusted in accordance with the wheel base.

When the driving of the motor unit 66 is stopped, due to the action of the nuts and the feed screws, the tire driving devices 118 are locked so as to not move in the longitudinal direction.

(3) When the positions of the respective tire driving devices 118 have been determined in accordance with the tread base and the wheel base, next, the vehicle 300 is moved onto the loading stand 18 from the direction of arrow B side with the steering wheel of the vehicle 300 set at the position for the vehicle to move straight forward, such that the wheels 302 of the vehicle 300 are positioned on the tire driving surfaces 136 of the tire driving devices 118 and the center line of the vehicle body is substantially parallel to the circulating direction of the endless tracks 134 of the tire driving devices 118.

When the wheels 302 correspond to the tire driving surfaces 136 of the respective tire driving devices 118, the second transfer plates 78 of the second sub-base 70 are positioned beneath the vehicle.

(4) The rods 501 are manually rotated and extended or contracted such that the holes, from which the wires 308 of the rods 501 are fed out, oppose the centers of the wheels 302. Then, the wires 308 are drawn out, and the distal ends thereof are anchored to the indication points 306 of the jigs 304.

(5) When the above-described operations have been completed, the operator instructs the control device 126 that wheel alignment measuring is to be carried out.

Figure 23:
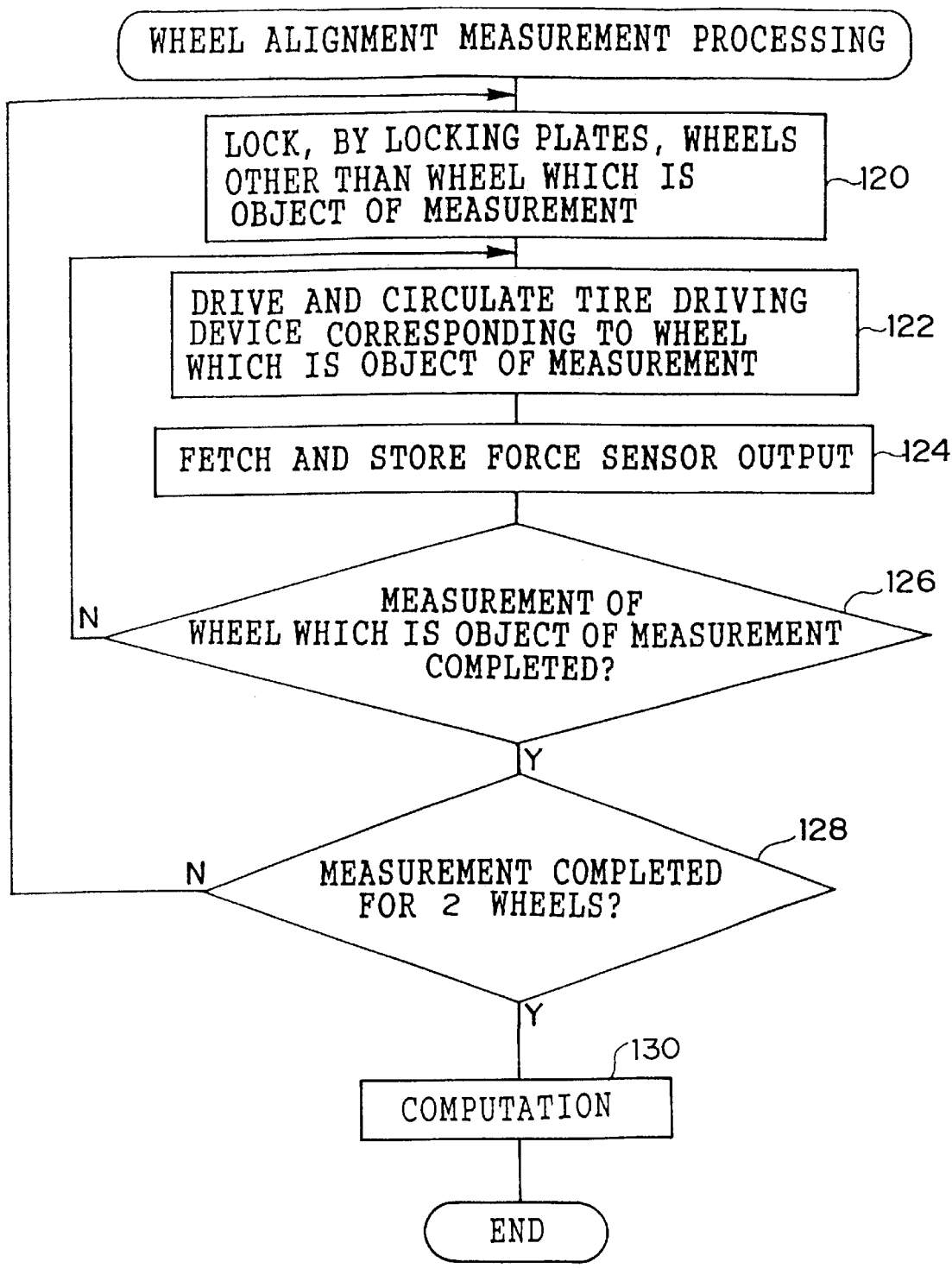
FIG. 23 is a flowchart showing wheel alignment measurement processing.
Figure 24:
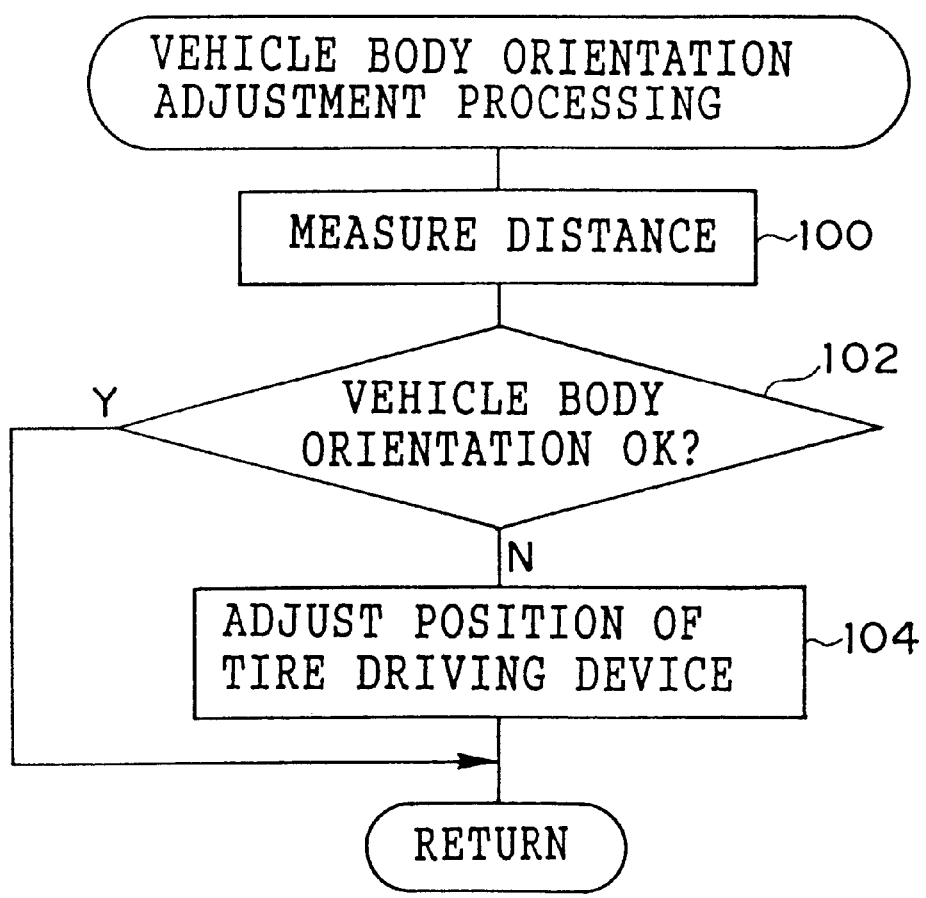
FIG. 24 is a flowchart showing vehicle body orientation adjustment processing.
Figure 25:
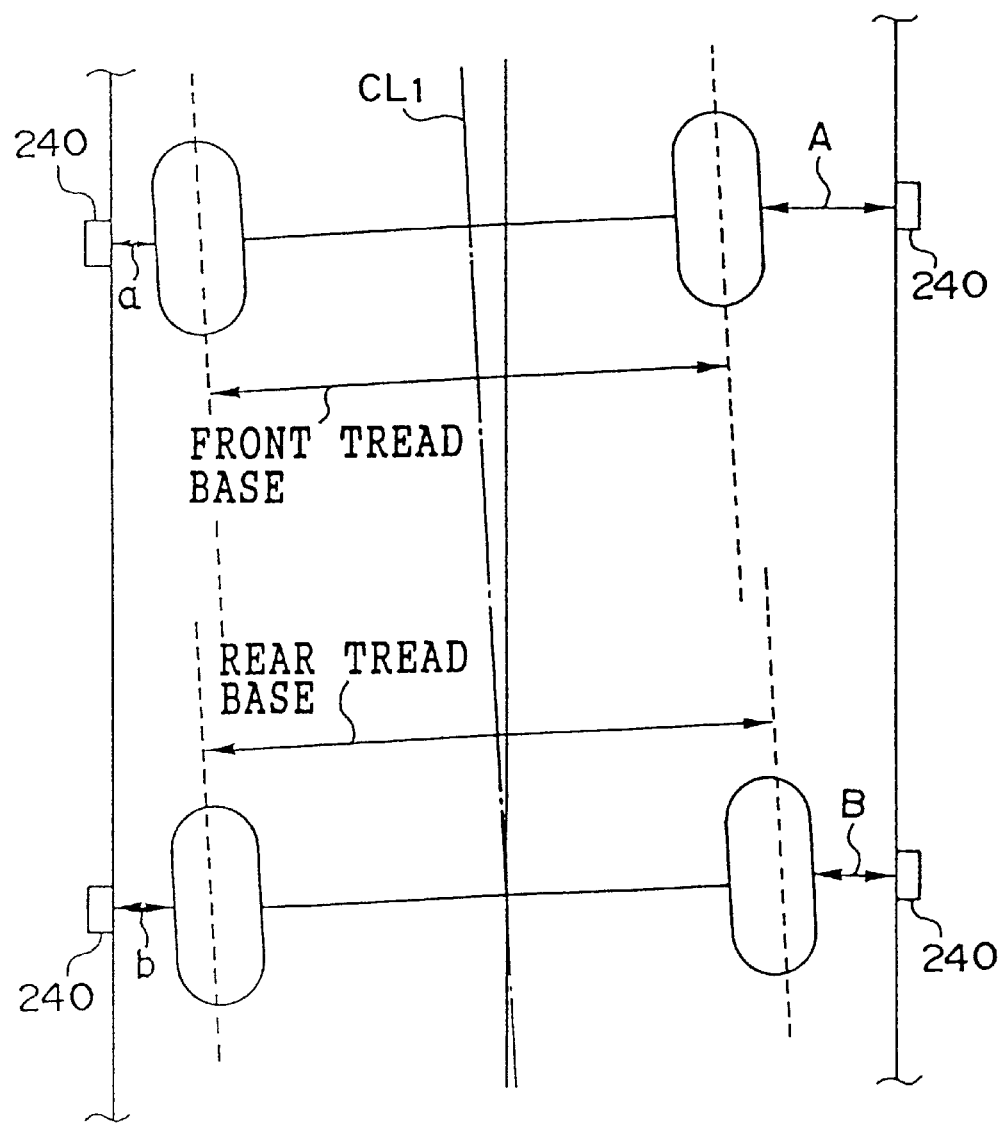
FIG. 25 is a view for explaining how vehicle body orientation is adjusted.

In this way, the control device 126 carries out in order the steps of wheel alignment measurement processing shown in FIG. 23, and periodically effects vehicle body orientation adjustment processing shown in FIG. 24 each time a predetermined period of time passes.

Hereinafter, the vehicle body orientation adjustment processing will be described first with reference to FIG. 24.

In step 100, the distances from the center (of the jig) of each wheel 302 of the vehicle 300 to the rod 501(the distances a, b, A, and B in FIG. 25) are measured by the four distance measuring means.

In step 102, the value (a-b) and the value (A-B) are compared. The value (a-b) is a value equal to the distance b between the center (the indicating point of the jig 304 which indicates the rotational axial center of the wheel 302) of the left rear wheel of the vehicle 300 and the rod 501 subtracted from the distance a between the center of the left front wheel of the vehicle 300 and the rod 501. The value (A-B) is a value equal to the distance B between the center of the right rear wheel of the vehicle 300 and the rod 501 subtracted from the distance A between the center of the right front wheel of the vehicle 300 and the rod 501. On the basis of the results of comparison, a determination is made as to whether the vehicle body is correctly oriented.

If (a-b)=(A-B) in step 102, even if the tread base of the front wheels of the vehicle 300 and the tread base of the rear wheels differ, it can be determined that the center line CL1 of the vehicle body is parallel to the circulating direction of the respective tire driving devices 118 of the wheel alignment measuring device. Thus, the determination is positive, and the vehicle body orientation adjustment processing ends without any processing being carried out.

On the other hand, if (a-b)≠(A-B) in step 102, the determination is negative, and the routine move on to step 104. Distances by which the tire driving devices 118 must be moved in order to establish the relationship (a-b)=(A-B) are computed. On the basis of the results of computation, the motors 182 are driven, and the tire driving devices 118 are moved in the circulating axial direction such that the positions are adjusted.

In the present embodiment, the two arrow F direction side tire driving devices 118 are not moved, and the two arrow B direction side tire driving devices 118 are fixed by the left and right connecting device 310 so as to not be able to move relative to one another. Positional adjustment is carried out by moving, in the circulating axial direction, only the two arrow B direction side tire driving devices 118 which are fixed relative to one another.

However, it is possible to move only the two arrow F direction side tire driving devices 118 and not move the two arrow B direction side tire driving devices 118. Or, position adjustment may be carried out by moving all four front and rear tire driving devices 118.

In this way, the orientation of the vehicle body is adjusted such that the central line CL1 of the vehicle body becomes parallel to the circulating direction of each of the tire driving devices 118 of the wheel alignment measuring device.

Due to the above processes, even if the central line CL1 of the vehicle body of the vehicle 300 which has been moved onto the loading stand 18 is not parallel to the circulating direction of the respective tire driving devices 118, the orientation of the vehicle body can be corrected such that the central line CL1 is made parallel to the circulating direction.

In the wheel alignment measuring processing (FIG. 23) which will be described later, the wheels 302 of the vehicle 300 are made to roll one at a time by the tire driving devices 118.

When the wheels 302 of the vehicle 300 are made to roll one at a time, due to the circulating axial direction force generated at the wheel 302 which is being made to roll, strain is generated at the tires which are not rolling, and the vehicle body is displaced slightly such that the positional angle of the wheel 302 which is rolling varies with respect to the tire driving surface 136. However, the above-described vehicle body orientation adjustment processing is carried out periodically even when the wheel 302 is being rolled. The tire driving devices 118 are moved such that, even if the position of the vehicle body is displaced due to the strain of the tires which are not being rolled, the positional angle, with respect to the tire driving surface 136, of the rolling wheel 302 can be maintained in a state which is the same as that when the position of the vehicle is not displaced. Thus, the positional angle of the rolling wheel 302 with respect to the tire driving surface 136 is kept constant, and the precision of measuring by the wheel alignment measurement processing is improved.

Next, adjustment of a toe angle of each rear wheel of the vehicle 300 will be described with reference to the flowchart of FIG. 23.

First, by rotating each handle 164 and setting each the supporting frame 148 to the reference position, the circulating directions of the left and right endless tracks 134 are made parallel. Since the two LEDs 408 are lit simultaneously at the reference position, it is easy for the operator to set the reference position.

In step 120, for the three wheels 302 other than the wheel 302 (e.g., the left rear wheel) which is the object of measurement, the respective wheel stopping plates 194F and 194B are rotated such that the three wheels which are not the object of measurement are locked so as to not move in the longitudinal direction of the vehicle.

In subsequent step 122, the tire driving device 118 corresponding to the wheel 302 which is the object of measurement is driven and circulated.

In this way, the tire 302 which is the object of measuring is made to roll on the tire driving surface 136. The tire 302 which is the object of measuring repeats the actions of riding up from the top surfaces of the plate members 132 onto the top surface of the protruding portion, and coming down off from the top surface of the protruding portion onto the top surfaces of the plate members 132.

Due to this riding up onto the protruding portion and coming down off of the protruding portion, a longitudinal force Fx (circulating direction force), a lateral force Fy (circulating axial direction force) and a load Fz (force in the direction orthogonal to the tire driving surface) are generated at the wheel 302 which is the object of measurement. In the present embodiment, among these three forces, the longitudinal force Fx and the lateral force Fy are measured by the force sensors 152.

As a result, in step 124, the outputs from- the force sensor 152 (the measured values of the longitudinal force Fx and the lateral force Fy) are sampled, and the measured values of the longitudinal force Fx and the lateral force Fy obtained by sampling are stored in a storing means such as a memory or the like.

In next step 126, a determination is made as to whether measurement for the wheel 302 which is the object of measurement has been completed.

If the determination is negative, the routine returns to step 122, and steps 122 through 126 are repeated at a relatively short cycle.

In this way, until the determination in step 126 becomes positive, the longitudinal force Fx and the lateral force Fy, which are generated by the wheel 302 which is the object of measurement and which is being rolled on the tire driving surface 136, are repeatedly measured at a relatively short cycle, and the results of measurement are successively stored.

When a condition is satisfied, such as when a predetermined period of time has elapsed, or when the tire has been rotated a predetermined number of rotations, or when the amount of measured data stored in the memory has reached a predetermined amount, the determination in step 126 is affirmative, and the routine proceeds to step 128. (These conditions are set such that continuous measurement of the longitudinal force Fx and the lateral force Fy, during the period from the time the wheel rides up on the protruding portion to the time the wheel comes down off of the protruding portion, is carried out at least one time.)

In step 128, a determination is made as to whether the above-described measuring processing has been carried out for the left and right wheels.

When the determination is negative, the routine returns to step 120, and the above processes are repeated by using another wheel 302 as the wheel which is the object of measurement.

When measurement processing has been carried out for the rear wheels and data on all of the wheels has been collected, the routine moves on to step 130 and computation is effected on the basis of the data on all of the wheels.

Computation for a single wheel is carried out as follows.

First, a plurality of measured values of the longitudinal force Fx and the lateral force Fy of the wheel which is the object of processing are fetched from the measured values of the longitudinal force Fx and the lateral force Fy which are stored and accumulated in the storing means.

Next, for each of the measured values of the longitudinal force Fx, the first-order derivative with respect to time (dFx/dt, i.e., the rate of change in the longitudinal force Fx) is computed.

Figure 26:
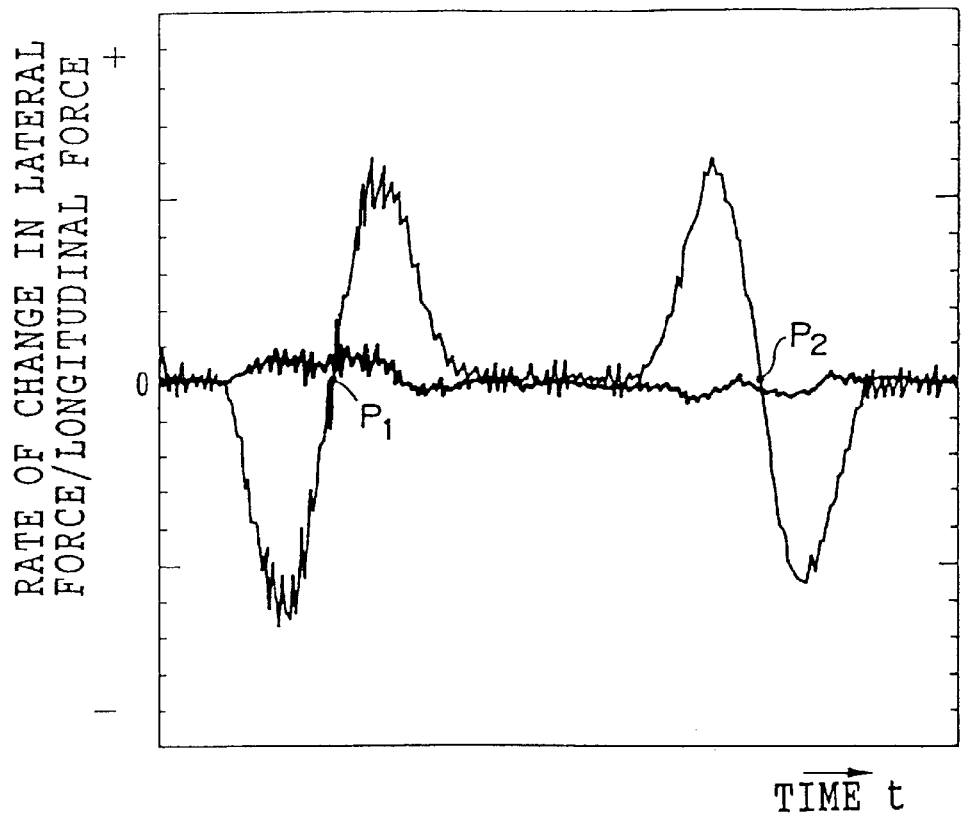
FIG. 26 is a graph illustrating an example of progress of a first order derivatives of longitudinal force generated at a tire and a first order derivatives of lateral force generated at a tire, when a wheel successively passes over an up-step and a down-step.

When the data of the first-order derivatives (dFx/dt) of the longitudinal force obtained by computation is plotted along a time axis, a waveform such as, for example, that illustrated by the thin solid line in FIG. 26 is obtained.

Next, from the series of data of the first-order derivatives (dFx/dt) of the longitudinal force, a series of data corresponding to the time the wheel passes over a step (an up-step and a down-step) is extracted.

As is clear from FIG. 26, when the wheel passes over a step, the tire greatly deforms. In this way, characteristic fluctuation patterns, in which there are two continuous large fluctuations having different plus/minus signs and amplitudes of a predetermined value or more, occur in the first-order derivatives (dFx/dt) of the longitudinal force.

Further, after a fluctuation in the negative direction when the wheel passes over an up-step, there is a fluctuation in the positive direction. After a fluctuation in the positive direction when the wheel passes over a down-step, there is a fluctuation in the negative direction.

Accordingly, extraction of data corresponding to the time the wheel passes over an up-step and the time the wheel passes over a down-step is realized, for example, as follows. Data, whose absolute value is a predetermined value or greater, is extracted from the data of the first-order derivatives (dFx/dt) of the longitudinal force. The extracted data is considered to be data of a peak of a fluctuation caused by the wheel passing over a step, or data in a vicinity of such a peak. If, in the series of data including this data and obtained by measurement within a predetermined time, there is a fluctuation pattern characteristic of passing over an up-step or a fluctuation pattern characteristic of passing over a down-step, this series of data is extracted as data for the time of the wheel passing over an up-step or data for the time of the wheel passing over a down-step.

Next, from the data at the time the wheel passes over an up-step which was extracted by the above process, the time (first time) at which the (absolute value of the) first-order derivative of the longitudinal force is a minimum after the first of the two fluctuations forming the characteristic fluctuation pattern has occurred, is determined. (Namely, the time at which the absolute value of the longitudinal force is a maximum is determined. This is the time corresponding to point $P_1$ in FIG. 26.) Specifically, for example, from the extracted series of data, data which is the boundary between the change in the plus/minus sign of the first-order derivatives of the longitudinal force is extracted (i.e., data of a point where, the sign of the data before this point and the sign of the data after this point are different, is extracted). The measured time of this data is determined to be the time at which the (absolute value of the) first-order derivative of the longitudinal force is a minimum.

Next, from the data at the time the wheel passes over a down-step, the time at which the (absolute value of the) first-order derivative of the longitudinal force is a minimum after the first of the two fluctuations forming the characteristic fluctuation pattern has occurred, is determined in the same way as the first time. (Namely, the time at which the absolute value of the longitudinal force is a maximum is determined. This is the time corresponding to point $P_2$ in FIG. 26.)

Then, from the measured values of the lateral force Fy fetched from the storing means, the measured values of the lateral force Fy which were measured in the period of time from the first time to the second time are extracted, and their first-order derivatives with respect to time (dFy/dt, i.e., rate of change in lateral force Fy) are respectively compared.

Here, when the data of the first-order derivatives (dFy/dt) of the lateral force obtained by computation is plotted along a time axis, a waveform such as that illustrated by the thick solid line in FIG. 26, for example, is obtained.

This waveform is stored as a waveform at the reference position (the waveform when the supporting frame is set at the reference position). (Alternatively, a printer may be connected to the device such that the waveform is printed onto a recording paper.) In this way, the data when the supporting frame 148 is set at the reference position is stored, and thereafter, the same processing is effected by changing, for example, the orientation of the circulating direction of the endless tracks 134 (rotational position of the supporting frame 148) 0.1 degrees at a time (e.g., the same processing is effected at five rotational positions including the reference position). Data is thereby collected and stored in the same way.

After the waveforms of a plurality of rotational positions of the left rear wheel are stored, the same processing is successively carried out on the right rear wheel, and waveforms of a plurality of rotational positions of the right rear wheel are stored.

The rotational angle detecting means 400 of the wheel alignment adjusting device 10 of the present embodiment transmits the rotational angle of the supporting frame 148 to the rotary encoder 414 with the rotational angle magnified, as described previously. The rotation angle of the supporting frame 148, whose rotational angle (orientation of the circulating direction of the endless tracks 134) can be changed by a maximum of 5 degrees, is displayed on the display device 126A. Therefore, the rotational angle detecting means 400 can change the orientation of the circulating direction of the endless tracks 134 correctly 0.1 degrees at a time.

Thereafter, the waveform which shows the rate of change in lateral force of the left rear wheel and the waveform which shows the rate of change in lateral force of the right rear wheel are compared. A combination of the waveforms which can obtain high straight-line (going-straight) stability, i.e., the optimal balance between the left rear wheel and the right rear wheel (i.e., a combination in which the lateral force generated at the right rear wheel and the lateral force generated at the left rear wheel offset each other), is found out. The angle, from the reference position, of the orientation of the circulating direction of the endless tracks 134, at which angle hat waveform was obtained, is stored, and the toe angle of each wheel is changed in accordance with the stored angle. In this way, when the vehicle actually travels, a good straight-line stability can be obtained.

In the present embodiment, the protruding portions are provided at the endless tracks 134. Since the toe angles of the left and right wheels can be adjusted in consideration of the fluctuation in force when the wheels pass over the protruding portion, adjustment can be carried out such that straight-line stability is not only obtained on flat roads but also obtained on the highways so that the vehicle can stably pass over projections on highways (e.g., joints in the road or the like).

Further, in the present embodiment, because the adjustment of the toe angle is carried out once, the toe angle can be adjusted easier than in conventional structures.

In the above embodiment, description is given of a method in which the waveforms of the left and right wheels are compared and the toe angles are adjusted so that the balance between the left and right wheels is the best. However, for example, the toe angles of the respective wheels may be adjusted in accordance with an angle at which the waveform having the smallest fluctuation is obtained. In this case, irregular wear of the tires can be also prevented.

(6) When the vehicle 300 is raised up in order to carry out adjustment of the vehicle 300 or the like, the motor unit 30 is driven.

Figure 27:
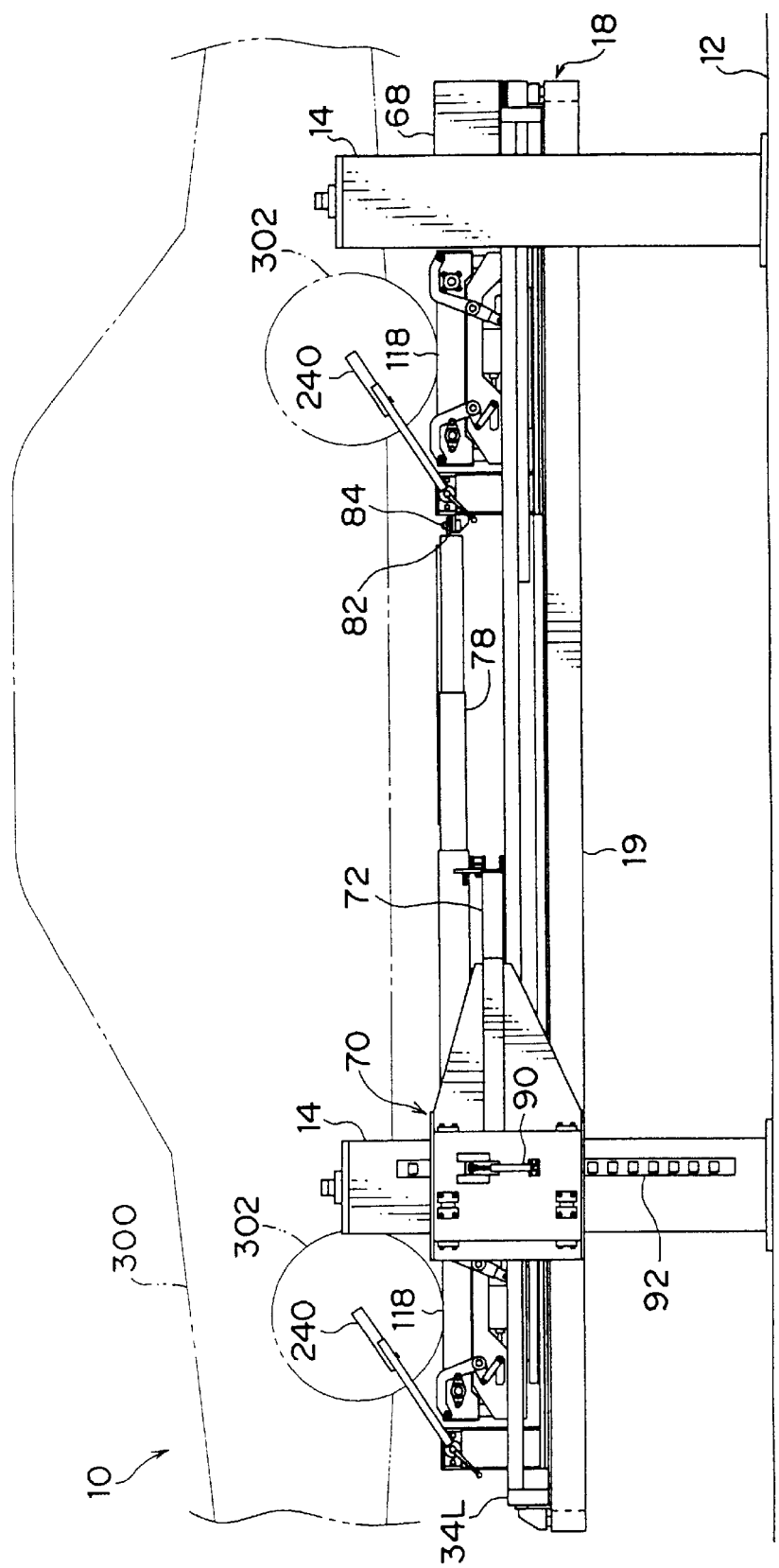
FIG. 27 is a side view, as seen from the left side of the wheel alignment adjusting device, illustrating a state in which the vehicle body is raised up.

When the motor unit 30 is driven and the chain 26 is driven in a predetermined direction, the sprockets 24 and the rotating members 22 of the respective supporting pillars 14 are rotated simultaneously. The loading stand 18 and the second sub-base 70 loaded on the loading stand 18 are integrally raised along the vertical feed screws 16. In this way, as illustrated in FIG. 27, a work space for a worker is formed beneath the loading stand 18.

(7) When the tires of the vehicle are to be changed, processes are carried out as follows.

(A) After the loading stand 18 and the second sub-base 70 are raised as described above, the loading stand 18 is lowered with the second sub-base 70 locked to the supporting pillars 14 by the lock devices 90 (see FIG. 1).

Usually, the air cylinders 102 urge the lock levers 96, by air pressure, in the directions in which the lower ends 96A of the lock levers 96 contact the lock plates 92. Thus, when the loading stand 18 is lowered, the lower ends 96A of the lock levers 96 enter into the square holes 94 and catch on the lower ends 94A (the state in FIG. 10). The lowering of the second sub-base 70 is stopped, and only the loading stand 18 is lowered.

If the lower ends 96A are inserted into the square holes 94, the lower ends 96A catch on the lower ends of the square holes 94. If the lower ends 96A of the lock levers 96 are not in the square holes 94, after the lower ends 96A are inserted into the square holes 94 therebeneath, the lower ends 96A catch on the lower ends of these square holes 94, and the lowering of the second sub-base 70 is thereby prevented.

(B) When driving of the motor unit 30 is continued, only the loading stand 18 is lowered. The lower surface of the vehicle body of the vehicle 300 abuts the upper surfaces of the second transfer plates 78 of the second sub-base 70, and the vehicle 300 is supported in a state of being disposed on the second sub-base 70. As is shown by the imaginary lines in FIG. 1, the tire driving devices 118 are separated from the wheels 302, and the tires can be changed in this state.

In this way, in the wheel alignment adjusting device 10 of the present embodiment, as described above, the second sub-base 70 is locked and only the loading stand 18 is lowered. Thus, the state can be changed from the state in which the second transfer plates 78 are loaded on the loading stand 18 to the state in which the second transfer plates 78 are separated from the loading stand 18. Therefore, when the tires are being changed, there is no need for a separate jack or a separate rigid rack, and changing of tires can be carried out easily.

After the tires have been changed, if alignment adjustment of the vehicle 300 is to be carried out or the vehicle 300 is to be taken off of the device, the loading stand 18 is raised and the second sub-base 70 is raised up slightly (by an amount that enables the lower ends 96A of the lock levers 96 to separate upward from the lower ends of the square holes 94). The air cylinders 102 are operated, and the lower ends 96A of the lock levers 96 move apart from the lock plates 92. In this way, the wheels of the vehicle 300 are loaded on the tire driving devices 118, and the vehicle body moves apart from the second sub-base 70.

Then, when the loading stand 18 is lowered with the lower ends 96A of the lock levers 96 separated from the lock plates 92, the second sub-base 70 is lowered together with the loading stand 18 while being disposed on the top surface of the loading stand 18.

After lowering has been completed, the air cylinders 102 are operated such that the lock levers 96 are urged in the directions in which the lower ends 96A of the lock levers 96 contact the lock plates 92.

(8) Moreover, when the orientation of the tire driving device 118 is changed (the rotating angle of the supporting frame 148 with respect to the transverse direction moving base plate 156), the handle 164 is rotated. In this way, the nut 162 moves in the longitudinal direction of the feed screw 160, and the supporting frame 148 and the portion which is connected thereto rotate. The rotational angle of the supporting frame 148 is displayed on the display device 126A. Moreover, when the orientation of the tire driving device 118 is returned (returned to the reference position), the handle 164 may be rotated in the opposite direction until the two LEDs 408 are lit simultaneously.

Another Embodiment

In the above-described embodiment, the rotary encoder 414 is mounted to the supporting frame 148 and the wire 424 is anchored to the transverse direction moving base plate 156. However, the rotary encoder 414 may be mounted to the transverse direction moving base plate 156 and the wire 424 may be anchored to the supporting frame 148.

Further, the sensor unit 404 is mounted to the supporting frame 148 and the magnet unit 406 is mounted to the transverse direction moving base plate 156. However, the sensor unit 404 may be mounted to the transverse direction moving base plate 156 and the magnet unit 406 may be mounted to the supporting frame 148.

Moreover, in the above-described embodiment, the wire 424 of the rotational angle detecting means 400 is anchored to the wire anchoring pins 422 of the transverse direction moving base plate 156. However, the present invention is not limited to the same. The wire 424 may be anchored to another portion of the transverse direction moving base plate or, for example, to the bearing 154 which is connected to the transverse direction moving base plate 156, or the like.

Furthermore, in the above embodiment, AH-002-S manufactured by Asa Electronic Industries Inc. is used for the sensors 404A of the reference position detecting means 402 and AG-001G manufactured by Asa Electronic Industries Inc. is used for the magnet unit 406. However, the present invention is not limited to the same. Optical sensors or the like may be used for the reference position detecting means 402, and any type of sensors are possible provided that the reference position can be grasped accurately.

As described above, in accordance with the wheel alignment adjusting device of the first aspect, the present invention achieves a superior effect in that alignment can be carried out easily and in a short time, and in particular, adjustment of the toe angle can be effected accurately and precisely.

In accordance with the wheel alignment adjusting device of the second aspect, the present invention achieves a superior effect in that it can be determined accurately over what angle the unit rotates.

In accordance with the wheel alignment adjusting device of the third aspect, the present invention achieves a superior effect in that it can be determined accurately over what angle the unit rotates from the reference position.

What is claimed is:

1. A wheel alignment adjusting device, comprising:
    a unit which includes a wheel rotating device which rotates a wheel of a vehicle loaded on the wheel alignment adjusting device;
    a base which ratatably supports said unit on a horizontal surface;
    a rotational angle detecting device which is mounted to one of said unit and said base and which detects a rotational angle by rotating a rotational shaft of said rotational angle detecting device; and
    a wire member, one portion of the wire member being trained around the rotational shaft and another portion of the wire member being anchored to a predetermined position being of another of said unit and said base, the predetermined position being separated, in a radial direction, from a rotational center of said unit by a distance which is greater than a radius of the rotational shaft.

2. A wheel alignment adjusting device according to claim 1, further comprising:
    a display device which is connected to said rotational angle detecting device and which displays the rotational angle of said unit with respect to said base.

3. A wheel alignment adjusting device according to claim 2, further comprising:
    a reference position detecting device which detects a reference position of said unit in a rotating direction with respect to said base, wherein said display device displays a rotational angle of said unit on the basis of the reference position.

4. A wheel alignment adjusting device according to claim 1, further comprising:
    a force sensor which measures force transmitted from said unit to said base.

5. A wheel alignment adjusting device according to claim 1, wherein end portions of the wire member are anchored at two anchoring portions, which are disposed on the other of said unit and said base, respectively, and a middle portion of the wire member is trained around the rotational shaft.

6. A wheel alignment adjusting device according to claim 5, wherein one of the two anchoring portions is disposed on a front side of the other of said unit and said base, and the other of the two anchoring portions is disposed on a rear side of the other of said unit and said base.

7. A wheel alignment adjusting device which includes a plurality of wheel driving devices which drive wheels of a vehicle loaded on said wheel alignment adjusting device, said wheel driving device comprising:
    a unit which includes wheel rotating device which rotates a wheel;
    a base which rotatably supports said unit in a horizontal plane;
    a rotational angle detecting device which is mounted to one of said unit and said base, said rotational angle detecting device including a rotating member which rotates on the basis of a rotation of said unit with respect to said base, and on the basis of the rotation of said rotating member, said rotational angle detecting device detects a rotational angle of said unit with respect to said base; and
    a wire shaped transmitting member, one portion of said wire shaped rotation transmitting member being mounted to said rotating member so as to have a predetermined rotating radius, and another portion of said wire shaped rotation transmitting member being anchored to a predetermined position of another of said unit and said base, and said wire shaped rotation transmitting member transmitting the rotation of said unit with respect to said base to said rotating member,
    wherein a distance between the predetermined position and a rotational center of said unit with respect to said base is larger than the predetermined rotating radius of said rotating member.

8. A wheel alignment adjusting device according to claim 7, further comprising:
    a force sensor which measures force transmitted from said unit to said base.

9. A wheel alignment adjusting device according to claim 7, further comprising:
    a display device which is connected to said rotational angle detecting device and which displays the rotational angle of said unit with respect to said base.

10. A wheel alignment adjusting device according to claim 9, further comprising:
    a reference position detecting device which detects a reference position of said unit in a rotating direction with respect to said base, wherein said display device displays a rotational angle of said unit on the basis of the reference position.

11. A wheel alignment adjusting device according to claim 7, wherein on the basis of the distance and the predetermined rotating radius, a magnification ratio, which is a ratio of the rotational angle of said rotating member with respect to the rotational angle of said unit with respect to said base, is determined.

12. A wheel alignment adjusting device according to claim 7, wherein end portions of the rotation transmitting member are anchored at two anchoring portions, which are disposed on the other of said unit and said base, respectively, and a middle portion of the rotation transmitting member is mounted to the rotating member.

13. A wheel alignment adjusting device according to claim 12, wherein one of the two anchoring portions is disposed on a front side of the other of said unit and said base, and the other of the two anchoring portion is disposed on a rear side of the other of said unit and said base.

* * * * *